United States Patent [19]

Moser

[11] 3,933,787
[45] Jan. 20, 1976

[54] SUBSTITUTED 4-(2-BENZOTHIAZOLYL)PHENYLAZO DYES HAVING A QUATERNARY AMMONIUM, HYDRAZINIUM OR OPTIONALLY SUBSTITUTED AMINO SUBSTITUENT

[75] Inventor: Helmut Moser, Reinach, Basel-Land, Switzerland

[73] Assignee: Sandoz Ltd., (Sandoz AG), Basel, Switzerland

[22] Filed: Jan. 12, 1973

[21] Appl. No.: 323,300

[60] Related U.S. Application Data

Division of Ser. No. 790,903, Jan. 10, 1969

[52] U.S. Cl. ............ 260/158; 8/7; 260/146 R; 260/154; 260/155; 260/156
[51] Int. Cl.² .............. C09B 29/10; C09B 29/32; C09B 29/38; D21H 1/46
[58] Field of Search .................... 260/158, 146 R

[56] References Cited
UNITED STATES PATENTS

| | | | |
|---|---|---|---|
| 1,871,673 | 8/1932 | Ellis et al. | 260/158 X |
| 2,620,273 | 12/1952 | Jennen | 260/158 X |
| 2,700,043 | 1/1955 | Baum et al. | 260/158 X |
| 2,831,848 | 4/1958 | Riat et al. | 260/146 R |
| 3,415,808 | 12/1968 | Weber et al. | 260/158 |
| 3,438,964 | 4/1969 | Dien | 260/158 |
| 3,454,552 | 7/1969 | Yamaya et al. | 260/155 |
| 3,560,476 | 2/1971 | Entschel et al. | 260/152 |
| 3,578,386 | 5/1971 | Kalopissis et al. | 260/158 X |
| 3,579,498 | 5/1971 | Dunworth | 260/158 |
| 3,592,806 | 7/1971 | Iizuka et al. | 260/157 |

Primary Examiner—Floyd D. Higel
Attorney, Agent, or Firm—Gerald D. Sharkin; Richard E. Vila; Melvyn M. Kassenoff

[57] ABSTRACT

Azo dyes of the formula

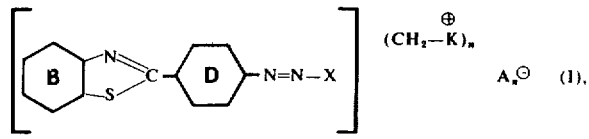

where
X stands for the radical of a coupling component of the aminobenzene, hydroxybenzene, aminonaphthalene, hydroxynaphthalene or heterocyclic series or one with a coupling methylene group,
$A_n^\ominus$ for an anion equivalent to $K_n^\oplus$,
$n$ for 1 to 6,
$K^\oplus$ for the group

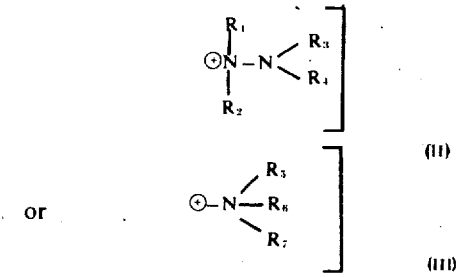

and where the aromatic rings B and/or D may be further substituted. The dyes are useful for dyeing and printing paper (e.g., dyeing in the stock). The dyed paper is fast to light and wet treatments and has good fastness to bleaching, water, alcohol and light.

14 Claims, No Drawings

SUBSTITUTED 4-(2-BENZOTHIAZOLYL)PHENYLAZO DYES HAVING A QUATERNARY AMMONIUM, HYDRAZINIUM OR OPTIONALLY SUBSTITUTED AMINO SUBSTITUENT

This application is a continuation of application Ser. No. 790,903, filed Jan. 10, 1969, and now abandoned.

This invention relates to a process for the dyeing and printing of paper, using for this purpose azo dyes of the formula

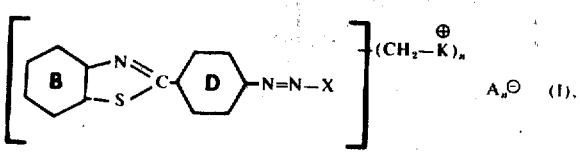 (I).

where
X stands for the radical of a coupling component of the aminobenzene, hydroxybenzene, aminonaphthalene, hydroxynaphthalene or heterocyclic series or one with a coupling methylene group,
$A_n^\ominus$ for an anion equivalent to $K_n^\oplus$,
n for 1 to 6,
$K^\oplus$ for the group

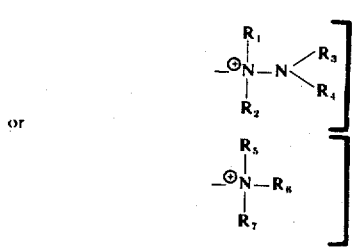

and where the aromatic rings B and/or D may be further substituted.

In formulae (II) and (III)
$R_1$ stands for an alkyl or cycloalkyl radical which may be substituted, or jointly with $R_2$ and the adjacent N atom for a heterocycle,
$R_2$ for an alkyl or cycloalkyl radical which may be substituted, or jointly with $R_1$ and the adjacent N atom for a heterocycle,
$R_3$ and $R_4$ stand for hydrogen atoms or identical or different alkyl or cycloalkyl radicals which may be substituted or identical or different acyl radicals,
$R_5$ stands for a hydrogen atom or an alkyl, aryl or cycloalkyl radical which may be substituted,
$R_6$ for a hydrogen atom or an alkyl, aryl or cycloalkyl radical which may be substituted,
$R_7$ for a hydrogen atom or an alkyl or cycloalkyl radical, which may be substituted, and
$R_1$ together with $R_3$ and/or $R_2$ together with $R_4$, together with the N atoms adjacent to the substituents, and
$R_5$ and $R_6$ or
$R_5$, $R_6$ and $R_7$ together with the adjacent N atoms may form heterocycles.

This invention relates further to azo dyes of the formula

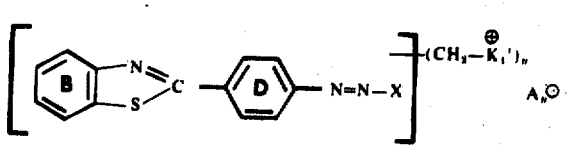

where
X stands for the radical of a coupling component of the aminobenzene, hydroxybenzene, aminonaphthalene, hydroxynaphthalene or heterocyclic series or one with a coupling methylene group,
$A_n^-$ for an anion equivalent to $(K'_1{}^+)_n$,
n for 1 to 6,
$K'_1{}^+$ for the group

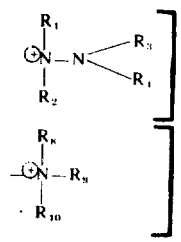

and where the aromatic rings B and/or D may be further substituted.

In formulae (II) and (V)
$R_1$ stands for an alkyl or cycloalkyl radical, which may be substituted, or jointly with $R_2$ and the adjacent N atom for a heterocycle,
$R_2$ for an alkyl or cycloalkyl radical which may be substituted, or jointly with $R_1$ and the adjacent N atom for a heterocycle,
$R_3$ and $R_4$ stand for hydrogen atoms or identical or different alkyl or cycloalkyl radicals, which may be substituted or identical or different acyl radicals,
$R_8$, $R_9$ and $R_{10}$ stand for alkyl or cycloalkyl radicals, which may be substituted,
and where $R_1$ together with $R_3$ and/or $R_2$ together with $R_4$ and the N atoms adjacent to these substituents,
and $R_8$ and $R_9$ or
$R_8$, $R_9$ and $R_{10}$ together with the adjacent N atom may form heterocycles.

This invention relates further to azo dyes of the formula

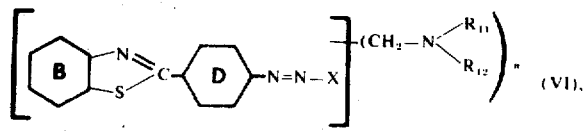

where
X represents the radical of a coupling component of the aminobenzene, hydroxybenzene, aminonaphthalene, hydroxynaphthalene or heterocyclic series or one with a coupling methylene group,
n 1 to 6,
and $R_{11}$ and $R_{12}$ each represents a hydrogen atom or an alkyl, aryl or cycloalkyl radical which may be substituted,
and where the aromatic rings B and/or D may be further substituted,
and the radicals $R_{11}$ and $R_{12}$, jointly with the adjacent N atom, may form a saturated or partially saturated heterocycle.

The dyes of formula (IV) can be produced, for example, by reacting one mole of a compound of the formula

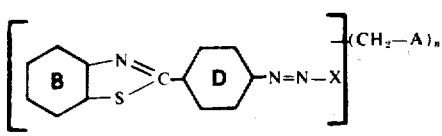 (VII), where
A represents a radical convertible into an anion, with $n$ moles of the compound of the formula

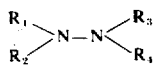 (VIII)

or

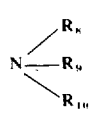 (IX)

The dyes of formula (VI) can be produced, for example, by reacting 1 mole of a compound of the formula

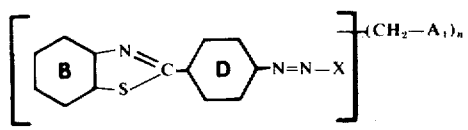 (X), where
$A_1$ represents the acid radical of an ester, with $n$ moles of a compound of formula

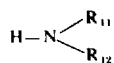 (XI).

Particularly good dyes are of the formula

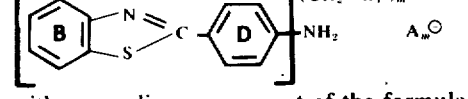 (XII), where
$m$ represents 1 to 3
and $A_m^\ominus$ an anion equivalent to $K'_{1m}^\oplus$.
The dyes of formula (XII) can be produced, for example, by coupling the diazo compound of an amine of the formula

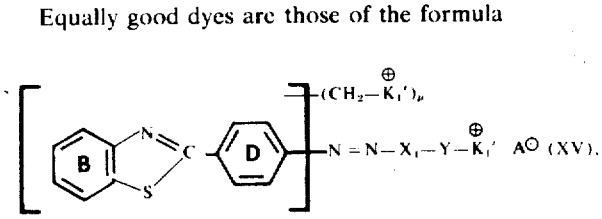 (XIII)

with a coupling component of the formula $$H - X \qquad (XIV).$$

Equally good dyes are those of the formula

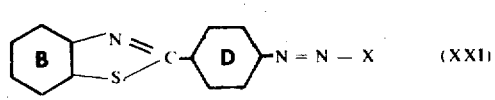 (XV), where
$X_1$ stands for the radical of a coupling component of the aminobenzene, hydroxybenzene, heterocyclic, aminonaphthalene or hydroxynaphthalene series, or one with a coupling methylene group,
Y for the direct linkage or a divalent bridge member,
$p$ for 0 to 3
and $A^-$ for an anion.

The dyes of formula (XV) can be produced, for example, by coupling the diazo compound of an amine of the formula

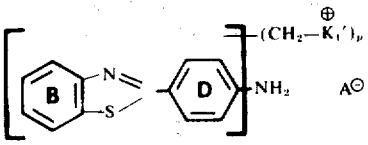 (XIIIa)

with a coupling component of the formula $$H - X_1 - Y - K'_1 A^- \qquad (XVI).$$

Similarly good dyes correspond to the formula

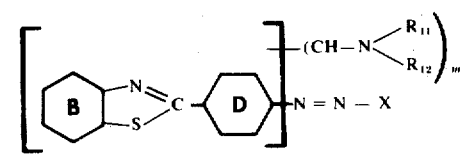 (XVII), where
$m$ represents 1 to 3.
The dyes of formula (XVII) are produced by coupling the diazo component of an amine of the formula

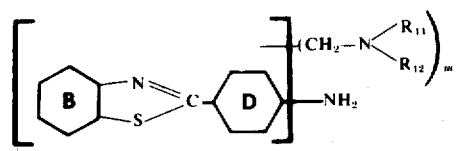 (XVIII)

with a coupling component of the formula $$H - X \qquad (XIV).$$

Equally good dyes correspond to the formula

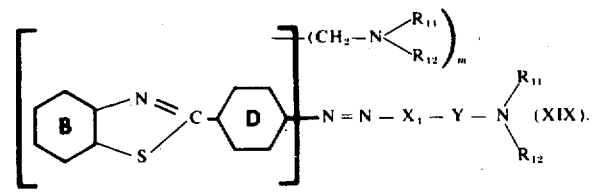 (XIX).

The dyes of formula (XIX) can be obtained by coupling a diazo component of an amine of formula (XVIII) with a coupling component of the formula $$H-X_1-Y-N\begin{matrix}R_{11}\\R_{12}\end{matrix} \qquad (XX)$$

Compounds of formula (VII) can be obtained by reacting 1 mole of a compound of the formula

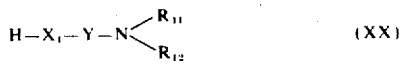 (XXI)

with n moles of halomethane.
Compounds of the formula

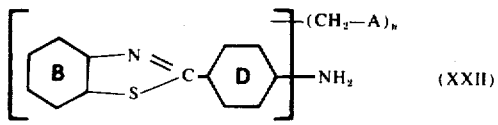

can be obtained by reacting 1 mole of a compound of the formula

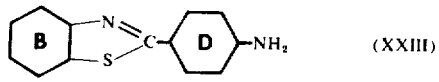

with n moles of halomethane.

In the compounds of formulae (I), (IV), (XII), (XIII), (XIIIa) and (XV) the anion $A^\ominus$ can be exchanged for other anions, e.g. with the aid of an ion exchanger or by reaction with salts or acids, if required in more than one stage, e.g. via the hydroxide.

Particularly good dyes are obtained when the radicals $R_3$ and $R_4$ stand for hydrogen atoms or when the radicals $R_1$ and $R_2$ and $R_5$ to $R_7$ or $R_8$ to $R_{10}$ each represents a lower alkyl radical, containing e.g. 1 to 3 carbon atoms, which may be substituted or when $R_{11}$ represents a preferably lower alkyl radical, containing e.g. 1 to 3 carbon atoms, which may be substituted and $R_{12}$ hydrogen or when the radicals $R_{11}$ and $R_{12}$ represent preferably lower alkyl radicals, containing e.g. 1 to 3 carbon atoms, which may be substituted. Halogen represents preferably chlorine or bromine.

When $R_3$ and $R_4$ do not stand for hydrogen atoms or acyl radicals and $R_5$, $R_6$, $R_{11}$ and $R_{12}$ do not stand for hydrogen atoms or aryl radicals and $R_7$ does not stand for a hydrogen atom, the radicals $R_1$ to $R_{12}$ represent unsubstituted or substituted methyl, ethyl, propyl, butyl, cycloalkyl, e.g. cyclohexyl, or benzyl radicals. If these radicals are substituted they contain in particular a hydroxyl group, a halogen atom or a cyano group.

The radicals $R_5$, $R_6$, $R_{11}$ and $R_{12}$ may alternatively stand for an aryl radical which may be substituted, such as phenyl, naphthyl or tetrahydronaphthyl radical. Examples of substituents for the aryl radicals are alkyl, alkoxy, halogen, cyano, nitro, hydroxyl and substituted or unsubstituted amino groups.

The radicals $R_1$ and $R_2$ and $R_{11}$ and $R_{12}$, together with the adjacent N atom, may form a heterocycle, for example a saturated or partly saturated heterocycle, e.g. a pyrrolidine, piperazine, morpholine, pyridine or piperidine ring.

The radical $R_1$ together with $R_3$ and/or the radical $R_2$ together with $R_4$ and the N atoms adjacent to these substituents may form a saturated or unsaturated, preferably five- or six-membered heterocycle, for example a pyrazolidine, pyridazine or pyrazoline ring, e.g. a trimethylenepyrazolidine or tetramethylenepyrazolidine ring.

The acyl radicals $R_3$ and $R_4$ are preferably of formula $R_{20}—SO_2—$ or $R_{21}—CO—$, where $R_{20}$ stands for an aromatic or saturated or unsaturated aliphatic or cycloaliphatic radical and $R_{21}$ for hydrogen or $R_{20}$. The two acyl radicals may form a ring with the adjacent N atom. $R_{20}$ or $R_{21}$ may represent, e.g. formyl, acetyl, propionyl, butyroyl, acryloyl, cyanoacetyl, benzoyl, methylsulphonyl, substituted or unsubstituted phenylsulphonyl.

The radicals $R_5$ and $R_6$ and $R_8$ and $R_9$, together with the adjacent N atom, may form a heterocycle, for example a pyrrolidine, piperidine, morpholine, aziridine or piperazine ring. The radicals $R_5$, $R_6$ and $R_7$ or $R_8$, $R_9$ and $R_{10}$, together with the adjacent N atom, may form a heterocycle, e.g. a group of the formula

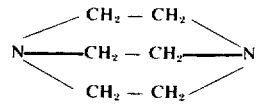

or may stand for a pyridine ring.

The rings B and/or D may be further substituted, preferably by non-water-solubilizing substituents. They contain preferably lower alkyl or alkoxy groups, containing e.g. 1 to 3 carbon atoms, or hydroxyaryl or alkoxyaryl groups.

The dyes of formulae (I), (IV), (VI), (XII), (XV), (XVII) and (XIX) may contain further a sulpho, carboxy, sulfamoyl, carbamoyl, alkylsulfonyl or arylsulfonyl group.

The anion $A^\ominus$ may be an organic or inorganic ion, e.g. a halogen ion such as that of chloride, bromide or iodide, the ion of methylsulphate, sulphate, disulphate, perchlorate, phosphotungstate, phosphotungstic molybdate, benzenesulphonate, naphthalenesulphonate, 4-chlorobenzenesulphonate, oxalate, maleinate, acetate, propionate, methanesulphonate, chloroacetate or benzoate, or a complex anion such as that of zinc chloride double salts.

The coupling components and/or aromatic rings B and/or D in the compounds of formulae (I), (IV), (XII) and (XV) may bear, besides a group $-K^\oplus$ or $-K_1^\oplus$, other cationic groups different from the aforenamed, e.g. ammonium, hydrazinium or cycloimmonium groups. The coupling components include, for example, those of the aromatic series, e.g. the benzene and naphthalene series, which bear one substituent capable of coupling, e.g. aminobenzenes, hydroxybenzenes, aminonaphthalenes and hydroxynaphthalenes; further, coupling components of the heterocyclic series such as the pyrazolone, quinoline, hydroxyquinoline and tetrahydroquinoline series, the aminopyrazole, indole and carbazole series, e.g. 1-phenyl-3-methyl-pyrazolone-5 and its derivatives, and compounds having a coupling methylene group, e.g. acylacetic acid alkyl and aryl amides, e.g. acetoacetylaminoalkyl amides and acetoacetylaminophenyl amides.

Examples of suitable components are 1-hydroxy-4-methylbenzene, 1,3-dihydroxybenzene, 2-hydroxynaphthalene, 1-hydroxy-4-methoxynaphthalene, 2-hydroxy-8-acetylamino- and 8-methylsulphonylaminonaphthalene, 1-hydroxy-6- and -7-amino-, -methylamino-, -phenylamino-, -(4'-methoxyphenylamino)-, -(2',4',6'-trimethylphenylamino)-naphthalene, aromatic compounds with one primary or secondary amino group such as aminobenzene and its derivative, 1,3-diaminobenzene, 1-aminonaphthalene, 2-amino-, 2-phenylamino- or 2-methylamino-5-hydroxynaphthalene; acetoacetylaminobenzenes, 1-acetoacetylamino-2-ethylhexane, 1-acetoacetylaminobutane, barbituric acid, 1-(3'-chlorophenyl)-3-methyl-5-pyrazolone, 1-(3'-cyanophenyl)-3-methyl-5-pyrazolone.

The preferred substituents in these compounds are non-water-solubilizing substituents such as those which occur in known dyes of acetate and polyester fibres. Special suitable substituents are halogen such as chlorine, bromine and fluorine, nitrile, nitro, alkyl, alkoxy, trihaloalkyl, alkylsulphonyl, sulphonamide, e.g. mono- and di-alkylsulphonamide, carbalkoxy (alkexycarbonyl), carboxylic acid amide and hydroxyl groups and arylazo groups such as azophenyl, azodiphenyl and azonaphthyl groups.

These compounds may however contain water-solubilizing substituents, e.g. sulphonic acid, sulphonic acid amide, carboxylic acid or carboxylic acid amide groups.

Y stands for the direct linkage or a divalent bridge member, which may be attached through a carbon atom to $K^{\oplus}$ or $K_1^{\oplus}$. The divalent bridge member may be an unsubstituted or substituted, straight or branched alkylene radical which may bear 1 to 12 or preferably 1 to 4 carbon atoms and may be interrupted by heteroatoms or groups of hetero atoms. It may alternatively stand for an unsubstituted or substituted arylene radical, e.g. a phenylene radical, or for an alkylene-phenylene or phenylene-alkylene radical.

Examples of hetero atoms and groups of hetero atoms are $$-\overset{R}{\underset{|}{N}}-, \quad -O-, \quad -S-, \quad -\overset{R}{\underset{|}{N}}-SO_2-, \quad -\overset{R}{\underset{|}{N}}-CO- \quad \text{or}$$

$$-CO-\overset{R}{\underset{|}{N}}-,$$

where R represents a hydrogen atom or an unsubstituted or substituted hydrocarbon radical, e.g. an alkyl radical.

Y may be, for example, $-(CH_2)_p-$, where p represents a number from 1 to 6, $$-CH_2-\overset{|}{CH}-CH_3,$$

$-NH-CO-CH_2-$, $-NH-CO-C_2H_4-$, $-O-CH_2-$, $-O-C_3H_6-$, $-CO-CH_2-$, $-O-C_2H_4-$, $-CO-NH-CH_2-$, $-CO-NH-C_3H_6-$, $-SO_2-C_2H_4-$,

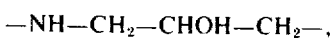

$-NH-CH_2-CHOH-CH_2-$,

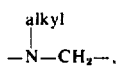

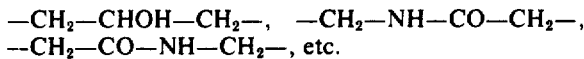

$-CH_2-CHOH-CH_2-$, $-CH_2-NH-CO-CH_2-$, $-CH_2-CO-NH-CH_2-$, etc.

The alkyl and alkoxy radicals usually contain 1 to 12 or 1 to 6 or preferably 1 to 4 carbon atoms. They may be straight or branched and may be substituted, e.g. by the hydroxyl or cyano group or by halogen atoms.

The reaction of a compound of formula (VII) or a compound of the formula

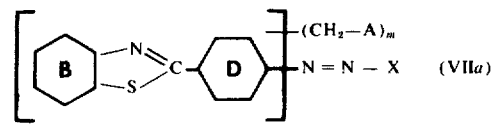

with a compound of formula (VIII) or (IX) to form a compound of formula (IV) or (XII) respectively is conducted preferably in water and at temperatures of −10°C to +100°C, advantageously at 20° to 50°C.

The reaction can be carried out in an organic solvent with or without the addition of water or in the absence of solvent at temperatures of −10° to 180°C, advantageously at 20° to 120°C.

Under the same conditions a compound of formula (X) or of the formula

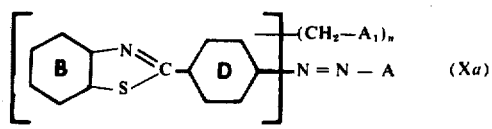

can be reacted with a compound of formula (XI) to give a compound of formula (VI) or (XVII) respectively.

The coupling reaction is effected by the known methods. The radicals A convertible into an anion and the acid radicals $A_1$ of esters are preferably those of hydrohalic acids; A or $A_1$ stands preferably for Cl or Br; further radicals A and $A_1$ are, for example, those of sulphuric acid, a sulphonic acid or of hydrogen sulphide.

The dye of the formula

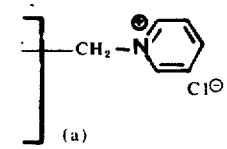

is known from British Pat. 576,270 for the dyeing of cellulosic fibres, whilst the dye of the formula

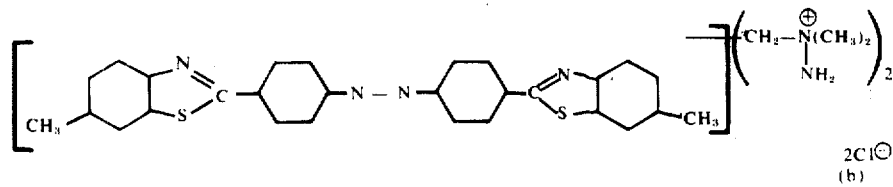

in known from French Pat. 1,495,232 and Belgian Patent 633,447 for the dyeing of paper.

It was surprising that the dyes of formulae (I), (IV) and (VI), can be discharged better with chlorine when dyed on paper are useful for dyeing and printing paper. Paper can be dyed by the normal methods. The dyeings on paper are fast to light and wet treatments and have good fastness to bleaching, water, alcohol and light. Mixture of two or more of the new dyes or mixtures of them and other cationic dyes can be employed advantageously. The dyes of this application are well-soluble in water and have good pH stability and good built-up power.

In the following Examples the parts and percentages are by weight and the temperatures in degrees centigrade.

EXAMPLE 1

24 Parts of 2-(4'-aminophenyl)-6-methylbenzothiazole are diazotized in hydrochloric acid solution with 7 parts of sodium nitrite. The diazonium salt solution is coupled with 15 parts of 2-hydroxynaphthalene in acetic acid solution. A red dye is formed which is dissolved in a mixture of 100 parts of chclorsulphonic acid and 35 parts of sulphuric acid, and to this solution 20 parts of paraformaldehyde are added. The solution is stirred in 300 parts of water and 100 parts of 40% aqueous trimethylamine solution for 10 hours at 40°. A water soluble red dye is obtained.

EXAMPLE 2 a. 24 Parts of 2-(4'-aminophenyl)-6-methylbenzothiazole and 20 parts of paraformaldehyde are entered into a mixture of 100 parts of chlorosulphonic acid and 35 parts of sulphuric acid. The mixture is stirred for 10 hours at 60°. The chloromethylated product is obtained.

b. 29 Parts of the chloromethylated 2-(4'-aminophenyl)-6-methylbenzothiazole are dissolved in 300 parts of water and 50 parts of a 40% aqueous trimethylamine solution. The solution is stirred for 4 hours at 40°, on which the corresponding trimethylammonium compound is obtained which is readily soluble in water.

c. This compound is diazotized with 7.2 parts of sodium nitrite in hydrochloric acid solution and coupled with 22 parts of acetoacetic acid anisidide in acetic acid solution. A greenish yellow dye is obtained.

EXAMPLE 3

The diazonium compound according to step b) of Example 2 is coupled with 18 parts of 1-phenyl-3-methylpyrazolone-5 in acetic acid solution to give an orange-yellow dye.

EXAMPLE 4

A dye identical with that of Example 1 is obtained when the diazonium compound of Example 2b) is coupled with 15 parts of 2-hydroxynaphthalene.

EXAMPLE 5

The chloromethylated compound obtained in Example 2 (a) is reacted with an aqueous solution of asymmetrical dimethylhydrazine for the formation of the corresponding dimethylhydrazinium compound.

The diazo compound of the dimethylhydrazinium compound thus obtained is coupled with 2-hydroxynaphthalene to give a red dye similar to that of Example 1.

DYEING EXAMPLE A 0.2 Parts of the dye of Example 1 or 6 are dissolved in water or in a mixture of water and acetic acid and the solution is stirred into paper stock consisting of 70 parts of chemically bleached sulphite cellulose and 30 parts of chemically bleached birch cellulose. After 10 minutes the stock is fabricated into absorbent paper which is dyed in a wet-fast red shade.

DYEING EXAMPLE B

100 Parts of chemically bleached sulphite cellulose are refined in a beater, during which operation 2 parts of rosin size and shortly afterwards 0.5 parts of an aqueous or aqueous-acetic acid solution of the dye of Example 1 or 6 are added. After 10 minutes 3 parts of aluminum sulphate are added and after a further 10 minutes the stock is converted into paper. The paper is dyed in a bright red shade of medium depth which is light- and wet-fast.

EXAMPLE 6

24 Parts of 2-(4'-aminophenyl)-6-methylbenzothiazole are diazotized in hydrochloric acid solution with 7 parts of sodium nitrite. The diazonium salt solution is coupled with 15 parts of 2-hydroxynaphthalene in acetic acid solution. A red dye is obtained.

The dye is dissolved in a mixture of 100 parts of chlorosulphonic acid and 35 parts of sulphuric acid and the solution mixed with 20 parts of paraformaldehyde. After stirring for 12 hours at 60° the chloromethylated dye is obtained. The dye is dissolved in a solution of 240 parts of 40% aqueous dimethylamine solution and 10 parts of sodium carbonate in 200 parts of water, with subsequent stirring at 40° for 5 hours. The product is a red dye which is soluble in a mixture of water and acetic acid.

EXAMPLE 7

The following procedure yields the same dye as that of Example 6. 24 Parts of 2-(4'-aminophenyl)-6-methylbenzothiazole and 20 parts of paraformaldehyde are entered into a mixture of 100 parts of chlorosulphonic acid and 35 parts of sulphuric acid. The mixture is stirred for 10 hours at 60°, on which the chloromethylated product is obtained.

The chloromethylated product is dissolved in a solution of 240 parts of a 40% aqueous dimethylamine solution and 10 parts of sodium carbonate in 300 parts of water and the resulting solution stirred for 5 hours at 40°. The corresponding dimethylamine compound is formed.

The dimethylamine compound is diazotized with sodium nitrite in hydrochloric acid solution and coupled with 2-hydroxynaphthalene in acetic acid solution.

EXAMPLE 8

24 Parts of 2-(4'-aminophenyl)-6-methylbenzothiazole are diazotized with 7 parts of sodium nitrite in hydrochloric acid solution and coupled with 34.3 parts of acetoacetic acid-2-methoxy-5-trimethylammoniummethylene-anilide in acetic acid solution. A water soluble dye of the formula

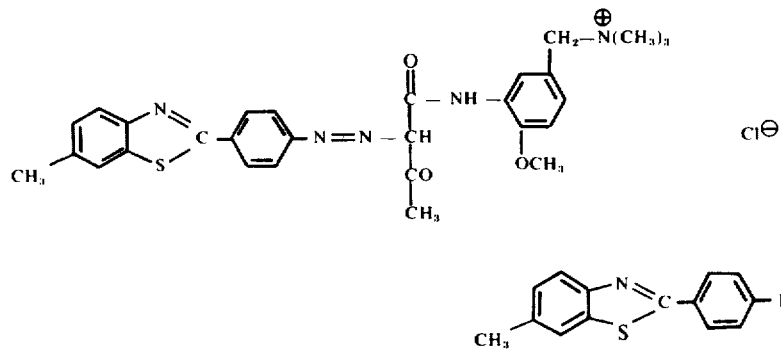

is obtained, which dyes paper in greenish yellow shades. The coupling component can be produced by the known method. Ortho-nitroanisole is chloromethylated and quaternated with trimethylamine, the nitro group is reduced by the Bechamp reaction and diketene is added.

EXAMPLE 9

24 Parts of 2-(4'-aminophenyl)-6-methylbenzothiazole are diazotized with 7 parts of sodium nitrite in hydrochloric acid solution and coupled with 41 parts of para-(beta-N-ethyl-N-phenylaminoethoxy)-phenyl-trimethylammonium chloride in acetic acid solution. A water soluble dye of the formula

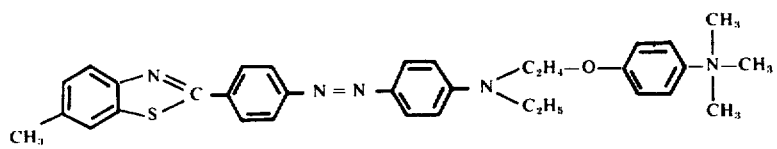

is obtained, which dyes paper in orange-yellow shades.

EXAMPLE 10

24 Parts of 2-(4'-aminophenyl)-6-methylbenzothiazole are diazotized in hydrochloric acid solution with 7 parts of sodium nitrite and coupled with 29 parts of acetoacetic acid-2-methoxy-5-dimethylaminomethylanilide in acetic acid solution. A dye is formed which has the formula

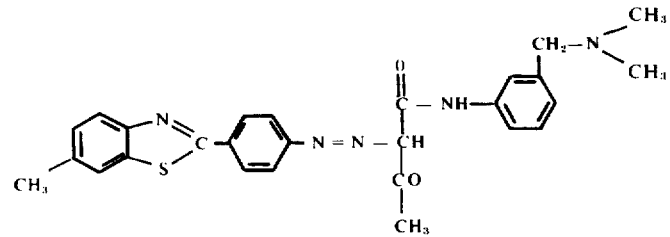

and dyes paper in greenish yellow shades.

The coupling component is prepared by the known method. Ortho-nitroanisole is chloromethylated and the chloromethyl group reacted with dimethylamine, the nitro group is reduced by the Bechamp reaction and diketene added.

EXAMPLE 11

24 Parts of 2-(4'-aminophenyl)-6-methylbenzothiazole are diazotized in hydrochloric acid solution with 7 parts of sodium nitrite and coupled with 38 parts of para-($\beta$-N-ethyl-M-phenylaminoethoxy)-phenyldimethylamine to yield a dye of the formula

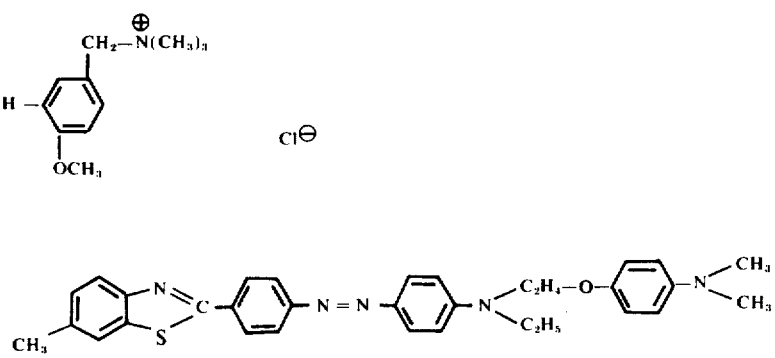

which gives dyeings of orange-yellow shade on paper.

Table I sets forth the structural composition of further dyes which can be produced and/or dyed in accordance with the present process. These dyes are of the formula:

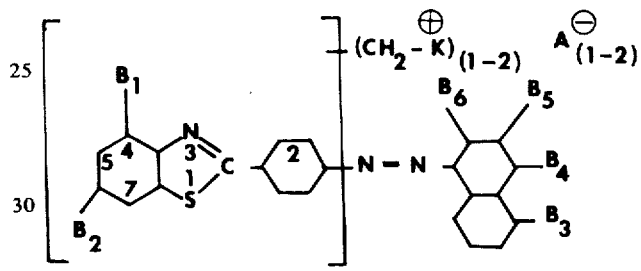
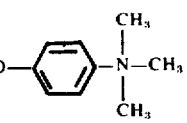

where $B_1$ to $B_6$ have the meanings given them in Table I. The anion $A^{\ominus}$ may be any one of those named in the description of the process. The symbol $K^{\oplus}$ may stand for any one of the radicals $K_1$ to $K_{27}$ listed in Table A below. These groupings may be exchanged in any given dye for another of the stated groupings. The grouping $-CH_2-K^{\oplus}$ may occur once or twice or preferably one and a half times in the dehydrotoluidine radical shown in square brackets; this grouping occupies preferably the 7 and/or 2' position.

Table A $K^{\ominus}$ may stand for any one of the radicals $K_1$ to $K_{27}$ which represent the following groupings:

Table A-continued

| | | | |
|---|---|---|---|
| $K_1$ | represents | $-N(CH_3)_3$ | ]⊕ |
| $K_2$ | " | $-N(C_2H_5)_3$ | ]⊕ |
| $K_3$ | " | $-N(C_2H_5)_2$ with $CH_3 / C_2H_5$ | ]⊕ |
| $K_4$ | " | $-N(CH_3)_2$ | ]⊕ |
| $K_5$ | " | $-N(C_2H_4OH)_3$ | ]⊕ |
| $K_6$ | " | $-N(C_2H_4OH)_2$ with $CH_3$ | ]⊕ |
| $K_7$ | " | $-N-CH_2OH$ with $CH_3 / C_2H_5$ | ]⊕ |
| | | $C_2H_4-CONH_2$ | |
| $K_8$ | " | $-N(CH_3)_2$ with $(CH_3)_2$ | ]⊕ |
| $K_9$ | " | $-N(C_2H_4OH)$ | ]⊕ |
| $K_{10}$ | " |  | ]⊕ |
| $K_{11}$ | " |  | ]⊕ |
| $K_{12}$ | " |  | ]⊕ |
| $K_{13}$ | " |  | ]⊕ |
| $K_{14}$ | " | 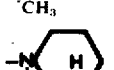 | ]⊕ |
| $K_{15}$ | " | 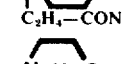 | ]⊕ |
| $K_{16}$ | " | 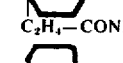 | ]⊕ |

Table A-continued

| | | | |
|---|---|---|---|
| $K_{17}$ | " |  | ]⊕ |
| $K_{18}$ | " |  | ]⊕ |
| $K_{19}$ | " | $-N(CH_3)_2$ with $NH_2$ | ]⊕ |
| $K_{20}$ | " | $-N(C_2H_5)_2$ with $NH_2$ | ]⊕ |
| $K_{21}$ | " | $-N(C_2H_4OH)_2$ with $NH_2$ | ]⊕ |
| $K_{22}$ | " |  | ]⊕ |
| $K_{23}$ | " |  | ]⊕ |
| $K_{24}$ | " | 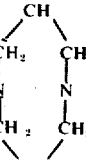 | ]⊕ |
| $K_{25}$ | " | $-N(C_2H_4-CONH_2)_2$ with $NH_2$ | ]⊕ |
| $K_{26}$ | " | $-N(C_2H_4ON)_2$ with $NH_2$ | ]⊕ |
| $K_{27}$ | " | (bicyclic diamine structure) | ]⊕ |

Table I

| Ex. No. | K | $B_1$ | $B_2$ | $B_3$ | $B_4$ | $B_5$ | $B_6$ | Shade of dyeing on paper |
|---|---|---|---|---|---|---|---|---|
| 12 | $K_2$ | H | $CH_3$ | H | H | H | OH | red |
| 13 | $K_3$ | H | do. | H | H | H | OH | do. |
| 14 | $K_4$ | H | do. | H | H | H | OH | do. |
| 15 | $K_5$ | H | do. | H | H | H | OH | do. |
| 16 | $K_6$ | H | do. | H | H | H | OH | do. |
| 17 | $K_7$ | H | do. | H | H | H | OH | do. |
| 18 | $K_8$ | H | do. | H | H | H | OH | do. |
| 19 | $K_9$ | H | do. | H | H | H | OH | do. |
| 20 | $K_{10}$ | H | do. | H | H | H | OH | do. |
| 21 | $K_{11}$ | H | do. | H | H | H | OH | do. |
| 22 | $K_{12}$ | H | do. | H | H | H | OH | do. |
| 23 | $K_{13}$ | H | do. | H | H | H | OH | do. |
| 24 | $K_{14}$ | H | do. | H | H | H | OH | do. |
| 25 | $K_{15}$ | H | do. | H | H | H | OH | do. |
| 26 | $K_{16}$ | H | do. | H | H | H | OH | do. |
| 27 | $K_{17}$ | H | do. | H | H | H | OH | do. |
| 28 | $K_{18}$ | H | do. | H | H | H | OH | do. |
| 29 | $K_{19}$ | H | do. | H | H | H | OH | do. |
| 30 | $K_{20}$ | H | do. | H | H | H | OH | do. |
| 31 | $K_{21}$ | H | do. | H | H | H | OH | do. |
| 32 | $K_{22}$ | H | do. | H | H | H | OH | do. |
| 33 | $K_{23}$ | H | do. | H | H | H | OH | do. |
| 34 | $K_{24}$ | H | do. | H | H | H | OH | do. |
| 35 | $K_{25}$ | H | $CH_3$ | H | H | H | OH | do. |
| 36 | $K_{26}$ | H | do. | H | H | H | OH | do. |
| 37 | $K_{27}$ | H | do. | H | H | H | OH | do. |
| 38 | $K_1-K_{27}$ | H | do. | H | H | $-CO-CH_3$ | OH | do. |

Table I-continued

| Ex. No. | K | $B_1$ | $B_2$ | $B_3$ | $B_4$ | $B_5$ | $B_6$ | Shade of dyeing on paper |
|---|---|---|---|---|---|---|---|---|
| 39 | do. | H | do. | H | H | $-CO-NH-\bigcirc-CO-C_2H_4-K_1$ | OH | do. |
| 40 | do. | H | do. | H | H | $-CO-NH-C_2H_5$ | OH | do. |
| 41 | do. | H | do. | H | OH | H | H | do. |
| 42 | do. | H | do. | H | OH | $-CO-C_2H_4-K_1$ | H | do. |
| 43 | do. | H | do. | H | $-SO_2-NH-\overset{CH_3}{\underset{}{CH}}-C_3H_6-K_1$ | H | OH | do. |
| 44 | do. | H | do. | H | H | $-CO-NH-C_2H_4-K_1$ | OH | do. |
| 45 | do. | H | do. | H | H | $-CO-NH-CH_2-\overset{OH}{\underset{}{CH}}-CH_2-K_1$ | OH | do. |
| 46 | do. | H | do. | H | $-NH-C_2H_4-OH$ | H | H | do. |
| 47 | do. | H | do. | H | $-N(CH_3)_2$ | H | OH | do. |
| 48 | do. | H | do. | H | do. | H | $-NH_2$ | do. |
| 49 | do. | H | do. | H | do. | H | $-NH-C_2H_4-OH$ | do. |
| 50 | do. | H | do. | H | do. | H | $-NH-CH_3$ | do. |
| 51 | do. | H | do. | H | do. | H | $-NH-C_6H_5$ | do. |
| 52 | do. | H | do. | H | Br | H | $-NH_2$ | do. |
| 53 | do. | H | do. | H | Cl | H | $-NH_2$ | do. |
| 54 | do. | H | do. | H | $CH_3$ | H | $-NH_2$ | do. |
| 55 | do. | H | do. | $CH_3$ | H | H | $-NH_2$ | do. |
| 56 | do. | H | $CH_3$ | $OCH_3$ | H | H | $-NH_2$ | do. |
| 57 | do. | H | do. | H | $-OCH_3$ | H | $-NH_2$ | do. |
| 58 | do. | H | do. | H | $-NH-C_2H_4-K_1$ | H | H | do. |
| 59 | do. | H | do. | H | $-O-CO-CH_2-K_1$ | H | H | do. |
| 60 | do. | H | do. | H | $-N\overset{C_2H_5}{\underset{CH_2-CH-CH_2-K}{}}$ $\quad OH$ | H | H | do. |
| 61 | do. | H | do. | H | $-SO_2-N(CH_3)_2$ | H | H | do. |
| 62 | do. | H | do. | H | H | $-COOC_2H_4-K_1$ | OH | do. |
| 63 | do. | H | do. | H | H | $-COOCH_3$ | OH | do. |
| 64 | do. | $CH_3$ | do. | H | H | H | OH | do. |
| 65 | do. | do. | do. | H | H | $-CO-CH_3$ | OH | do. |
| 66 | do. | do. | do. | H | H | $-CO-NH-\bigcirc-CO-C_2H_4-K_1$ | OH | do. |
| 67 | do. | do. | do. | H | H | $-CO-NH-C_6H_5$ | OH | do. |
| 68 | do. | do. | do. | H | OH | H | H | do. |
| 69 | do. | do. | do. | H | OH | $-CO-C_2H_4-K_1$ | H | do. |
| 70 | do. | do. | do. | H | $-SO_2-NH-\overset{CH_3}{\underset{}{CH}}-C_3H_6-K_1$ | H | OH | do. |
| 71 | do. | do. | do. | H | $-NH-C_2H_4-OH$ | H | H | do. |
| 72 | do. | do. | do. | H | H | $-CO-NH-C_2H_4-K_1$ | OH | do. |
| 73 | do. | do. | do. | H | H | $-CO-NH-CH_2-\overset{OH}{\underset{}{CH}}-CH_2-K_1$ | OH | do. |
| 74 | do. | do. | do. | H | $-N(CH_3)_2$ | H | H | do. |
| 75 | do. | do. | do. | H | $-N(CH_3)_2$ | H | $-NH_2$ | do. |
| 76 | do. | do. | do. | H | do. | H | $-NH-C_2H_4-OH$ | do. |
| 77 | do. | do. | do. | H | do. | H | $-NH-CH_3$ | do. |
| 78 | do. | do. | do. | H | do. | H | $-NH-C_6H_5$ | do. |
| 79 | do. | do. | do. | H | Br | H | $-NH_2$ | do. |
| 80 | do. | do. | do. | H | Cl | H | $-NH_2$ | do. |
| 81 | do. | do. | do. | H | $CH_3$ | H | $-NH_2$ | do. |
| 82 | do. | do. | do. | $CH_3$ | H | H | $-NH_2$ | do. |
| 83 | do. | do. | do. | $OCH_3$ | H | H | $-NH_2$ | do. |
| 84 | do. | do. | do. | H | $-OCH_3$ | H $-NH_2$ | do. | |
| 85 | do. | do. | do. | H | $-NH-C_2H_4-K_1$ | H | H | do. |
| 86 | do. | do. | do. | H | $-O-CO-CH_2-K_1$ | H | H | do. |
| 87 | do. | do. | do. | H | $-N\overset{CH_2-CH-CH_2-K_1}{\underset{C_2H_5}{\quad OH}}$ | H | H | do. |
| 88 | do. | do. | do. | H | $-SO_2-N(CH_3)_2$ | H | H | do. |
| 89 | do. | do. | do. | H | H | $-COOC_2H_4-K_1$ | OH | do. |
| 90 | do. | do. | do. | H | H | $-COOCH_3$ | OH | do. |
| 91 | do. | H | H | H | H | H | OH | do. |
| 92 | do. | H | H | H | H | $-CO-CH_3$ | OH | do. |
| 93 | do. | H | H | H | H | $-CO-NH-\bigcirc-CO-C_2H_4-K_1$ | OH | do. |
| 94 | do. | H | H | H | H | $-CO-NH-C_6H_5$ | OH | do. |
| 95 | do. | H | H | H | OH | H | H | do. |
| 96 | do. | H | H | H | OH | $-CO-C_2H_4-K_1$ | H | do. |
| 97 | do. | H | H | H | $-SO_2-NH-\overset{CH_3}{\underset{}{CH}}-C_3H_6-K_1$ | H | OH | do. |
| 98 | do. | H | H | H | $-NH-C_2H_4-OH$ | H | H | do. |
| 99 | do. | H | H | H | H | $-CO-NH-C_2H_4-K_1$ | OH | do. |
| 100 | do. | H | H | H | H | $-O-CO-NH-CH_2-\overset{OH}{\underset{}{CH}}-CH_2-K_1$ | OH | do. |

Table I-continued

| Ex. No. | K | $B_1$ | $B_2$ | $B_3$ | $B_4$ | $B_5$ | $B_6$ | Shade of dyeing on paper |
|---|---|---|---|---|---|---|---|---|
| 101 | do. | H | H | H | —N(CH$_3$)$_2$ | H | H | do. |
| 102 | do. | H | H | H | do. | H | —NH$_2$ | do. |
| 103 | do. | H | H | H | do. | H | —NH—C$_2$H$_4$—OH | do. |
| 104 | do. | H | H | H | do. | H | —NH—CH$_3$ | do. |
| 105 | do. | H | H | H | do. | H | —NH—C$_6$H$_5$ | do. |
| 106 | do. | H | H | H | Br | H | —NH$_2$ | do. |
| 107 | do. | H | H | H | Cl | H | —NH$_2$ | do. |
| 108 | do. | H | H | H | CH$_3$ | H | —NH$_2$ | do. |
| 109 | do. | H | H | CH$_3$ | H | H | —NH$_2$ | do. |
| 110 | do. | H | H | OCH$_3$ | H | H | —NH$_2$ | do. |
| 111 | do. | H | H | H | —OCH$_3$ | H | —NH$_2$ | do. |
| 112 | do. | H | H | H | —NH—C$_2$H$_4$—K$_1$ | H | H | do. |
| 113 | do. | H | H | H | —O—CO—CH$_2$—K$_1$ | H | H | do. |
| 114 | do. | H | H | H | —N(CH$_2$—CH(OH)—CH$_2$—K$_1$)(C$_2$H$_5$) | H | H | do. |
| 115 | do. | H | H | H | —SO$_2$—N(CH$_3$)$_2$ | H | H | do. |
| 116 | do. | H | H | H | H | —COO—C$_2$H$_4$—K$_1$ | OH | do. |
| 117 | do. | H | H | H | H | —COOCH$_3$ | OH | do. |
| 118 | do. | H | OC$_2$H$_5$ | H | H | H | OH | do. |
| 119 | do. | H | do. | H | H | —CO—CH$_3$ | OH | do. |
| 120 | do. | H | do. | H | H | —CO—NH—⬡—CO—C$_2$H$_4$—K$_1$ | OH | do. |
| 121 | do. | H | do. | H | H | —CO—NH—C$_6$H$_5$ | OH | do. |
| 122 | do. | H | do. | H | OH | H | H | do. |
| 123 | do. | H | do. | H | OH | —CO—C$_2$H$_4$—K$_1$ | H | do. |
| 124 | do. | H | do. | H | —SO$_2$—NH—CH(CH$_3$)—C$_3$H$_6$—K$_1$ | H | OH | do. |
| 125 | do. | H | do. | H | —NH—C$_2$H$_4$—OH | H | H | do. |
| 126 | do. | H | do. | H | H | —CO—NH—C$_2$H$_4$—K$_1$ | OH | do. |
| 127 | do. | H | do. | H | H | —CO—NH—CH$_2$—CH(OH)—CH$_2$—K$_1$ | OH | do. |
| 128 | do. | H | do. | H | —N(CH$_3$)$_2$ | H | H | do. |
| 129 | do. | H | do. | H | do. | H | —NH$_2$ | do. |
| 130 | do. | H | do. | H | do. | H | —NH—C$_2$H$_4$—OH | do. |
| 131 | do. | H | do. | H | do. | H | —NH—CH$_3$ | do. |
| 132 | do. | H | do. | H | do. | H | —NH—C$_6$H$_5$ | do. |
| 133 | do. | H | do. | H | Br | H | —NH$_2$ | do. |
| 134 | do. | H | do. | H | Cl | H | —NH$_2$ | do. |
| 135 | do. | H | do. | H | CH$_3$ | H | —NH$_2$ | do. |
| 136 | do. | H | do. | CH$_3$ | H | H | —NH$_2$ | do. |
| 137 | do. | H | do. | OCH$_3$ | H | H | —NH$_2$ | do. |
| 138 | do. | H | do. | H | —OCH$_3$ | H | —NH$_2$ | do. |
| 139 | do. | H | do. | H | —NH—C$_2$H$_4$—K$_1$ | H | H | do. |
| 140 | do. | H | do. | H | —O—CO—CH$_2$—K$_1$ | H | H | do. |
| 141 | do. | H | do. | H | —N(CH$_2$—CH(OH)—CH$_2$—K$_1$)(C$_2$H$_5$) | H | H | do. |
| 142 | do. | H | do. | H | —SO$_2$—N(CH$_3$)$_2$ | H | H | do. |
| 143 | do. | H | do. | H | H | —COO—C$_2$H$_4$—K$_1$ | OH | do. |
| 144 | do. | H | do. | H | H | —COOCH$_3$ | OH | do. |

Table II gives the structural composition of further dyes which can be produced and/or dyed in accordance with the present process. These dyes are of the formula

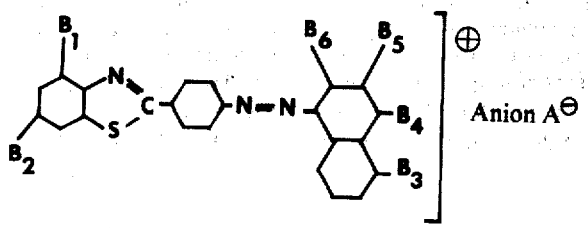

Anion A$^\ominus$ where $B_1$ to $B_6$ have the meanings given them in Table II. The anion A$^-$ may be any one of those named in the description of the process. The Symbol K may represent any one of the radicals K$_1$ to K$_{27}$ listed in Table A; these groupings may be exchanged in any given dye for another of the stated groupings.

Table II

| Ex. No. | $B_1$ | $B_2$ | $B_3$ | $B_4$ | $B_5$ | $B_6$ | Shade of dyeing on Paper |
|---|---|---|---|---|---|---|---|
| 145 | H | $CH_3$ | H | H | $-CO-NH-\bigcirc-CO-C_2H_4-K_1$ | OH | red |
| 146 | H | $CH_3$ | H | OH | $-CO-C_2H_4-K_1$ | H | do. |
| 147 | H | $CH_3$ | H | $-SO_2-NH-\overset{CH_3}{\underset{}{C}H}-C_3H_6-K_1$ | H | OH | do. |
| 148 | H | $CH_3$ | H | H | $-CO-NH-C_2H_4-K_1$ | OH | do. |
| 149 | H | $CH_3$ | H | H | $-CO-NH-CH_2-\overset{OH}{\underset{}{C}H}-CH_2-K_1$ | OH | do. |
| 150 | H | $CH_3$ | H | $NH-C_2H_4-K_1$ | H | H | do. |
| 151 | H | $CH_3$ | H | $-O-CO-CH_2-K_1$ | H | H | do. |
| 152 | H | $CH_3$ | H | $-N\begin{smallmatrix}CH_2-\overset{OH}{C}H-CH_2-K_1\\C_2H_5\end{smallmatrix}$ | H | H | do. |
| 153 | H | $CH_3$ | H | H | $-COOC_2H_4-K_1$ | OH | do. |
| 154 | $CH_3$ | $CH_3$ | H | H | $-CO-NH-\bigcirc-CO-C_2H_4-K_1$ | OH | do. |
| 155 | $CH_3$ | $CH_3$ | H | OH | $-CO-C_2H_4-K_1$ | H | do. |
| 156 | $CH_3$ | $CH_3$ | H | $-SO_2-NH-\overset{CH_3}{\underset{}{C}H}-C_3H_6-K_1$ | H | OH | do. |
| 157 | $CH_3$ | $CH_3$ | H | H | $-CO-NH-C_2H_4-K_1$ | OH | do. |
| 158 | $CH_3$ | $CH_3$ | H | H | $-CO-NH-CH_2-\overset{OH}{\underset{}{C}H}-CH_2-K_1$ | OH | do. |
| 159 | $CH_3$ | $CH_3$ | H | $-NH-C_2H_4-K_1$ | H | H | do. |
| 160 | $CH_3$ | $CH_3$ | H | $-O-CO-CH_2-K_1$ | H | H | do. |
| 161 | $CH_3$ | $CH_3$ | H | $-N\begin{smallmatrix}CH_2-\overset{OH}{C}H-CH_2-K_1\\C_2H_5\end{smallmatrix}$ | H | H | do. |
| 162 | $CH_3$ | $CH_3$ | H | H | $-COOC_2H_4-K_1$ | OH | do. |
| 163 | H | H | H | H | $-CO-NH-\bigcirc-CO-C_2H_4-K_1$ | OH | do. |
| 164 | H | $OC_2H_5$ | H | H | do. | OH | do. |
| 165 | H | H | H | OH | $-CO-C_2H_4-K_1$ | H | do. |
| 166 | H | $OC_2H_5$ | H | OH | do. | H | do. |
| 167 | H | H | H | $-SO_2-NH-\overset{CH_3}{\underset{}{C}H}-C_3H_6-K_1$ | H | OH | do. |
| 168 | H | $OC_2H_5$ | H | do. | H | OH | do. |
| 169 | H | H | H | H | $-CO-NH-C_2H_4-K_1$ | OH | do. |
| 170 | H | $OC_2H_5$ | H | H | do. | OH | do. |
| 171 | H | H | H | H | $-CO-NH-CH_2-\overset{OH}{\underset{}{C}H}-CH_2-K_1$ | OH | do. |
| 172 | H | $OC_2H_5$ | H | H | do. | OH | do. |
| 173 | H | H | H | $-NH-C_2H_4-K_1$ | H | H | do. |
| 174 | H | $OC_2H_5$ | H | do. | H | H | do. |
| 175 | H | H | H | $-O-CO-CH_2-K_1$ | H | H | do. |
| 176 | H | $OC_2H_5$ | H | do. | H | H | do. |
| 177 | H | H | H | $-N\begin{smallmatrix}CH_2-\overset{OH}{C}H-CH_2-K_1\\C_2H_5\end{smallmatrix}$ | H | H | do. |
| 178 | H | $OC_2H_5$ | H | do. | H | H | do. |

Table III lists the structural composition of further dyes which may be produced and/or dyed in accordance with the present process. These dyes are of the formula

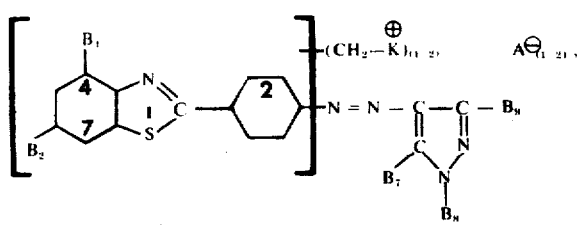

where $B_1$, $B_2$, $B_7$, $B_8$ and $B_9$ have the meanings them in Table III. The anion $A^\ominus$ may be any one of those named in the specification, $K^\oplus$ may be any one of the radicals $K_1$ to $K_{27}$ listed in Table A; these groupings may be exchanged in any given dye for another of the stated groupings. The grouping $-CH_2-K^\oplus$ may occur once or twice or preferably one and a half times in the dehydrotoluidine radical given inside the square brackets; this grouping is preferably in the 7 and/or 2' position.

Table III

| Ex. No. | K | $B_1$ | $B_2$ | $B_7$ | $B_8$ | $B_9$ | Shade of dyeing on Paper |
|---|---|---|---|---|---|---|---|
| 179 | $K_1-K_{27}$ | H | $CH_3$ | OH | –⬡ | $CH_3$ | orange |
| 180 | do. | H | $CH_3$ | $NH_2$ | –⬡ | H | do. |
| 181 | do. | H | $CH_3$ | $NH_2$ | –⬡ | $CH_3$ | do. |
| 182 | do. | H | $CH_3$ | OH | $-CH_2-CH_2-K_1$ | ⬡ | do. |
| 183 | do. | H | $CH_3$ | OH | H | $CH_3$ | do. |
| 184 | do. | H | $CH_3$ | OH | –⬡–NH–CO–$C_2H_4$–$K_1$ | $CH_3$ | do. |
| 185 | do. | H | $CH_3$ | OH | –⬡–$OCH_3$ | $CH_3$ | do. |
| 186 | do. | H | $CH_3$ | OH | –⬡–$CH_2$–$K_1$ | $CH_3$ | do. |
| 187 | do. | $CH_3$ | $CH_3$ | OH | –⬡ | $CH_3$ | do. |
| 188 | do. | $CH_3$ | $CH_3$ | $NH_2$ | –⬡ | H | do. |
| 189 | do. | $CH_3$ | $CH_3$ | $NH_2$ | –⬡ | $CH_3$ | do. |
| 190 | do. | $CH_3$ | $CH_3$ | OH | $-CH_2-CH_2-K_1$ | ⬡ | do. |
| 191 | do. | $CH_3$ | $CH_3$ | OH | H | $CH_3$ | do. |
| 192 | do. | $CH_3$ | $CH_3$ | OH | –⬡–NH–CO–$C_2H_4$–$K_1$ | $CH_3$ | do. |
| 193 | do. | $CH_3$ | $CH_3$ | OH | –⬡–$OCH_3$ | $CH_3$ | do. |
| 194 | do. | $CH_3$ | $CH_3$ | OH | –⬡–$CH_2$–$K_1$ | $CH_3$ | do. |
| 195 | do. | H | H | OH | –⬡ | $CH_3$ | do. |
| 196 | do. | H | H | $NH_2$ | –⬡ | H | do. |
| 197 | do. | H | H | $NH_2$ | –⬡ | $CH_3$ | do. |
| 198 | do. | H | H | OH | $-CH_2-CH_2-K_1$ | ⬡ | do. |
| 199 | do. | H | H | OH | H | $CH_3$ | do. |
| 200 | do. | H | H | OH | –⬡–NH–CO–$C_2H_4$–$K_1$ | $CH_3$ | do. |
| 201 | do. | H | H | OH | –⬡–$OCH_3$ | $CH_3$ | do. |
| 202 | do. | H | H | OH | –⬡–$CH_2$–$K_1$ | $CH_3$ | do. |
| 203 | do. | H | $OC_2H_5$ | OH | –⬡ | $CH_3$ | do. |
| 204 | do. | H | $OC_2H_5$ | $NH_2$ | –⬡ | H | do. |
| 205 | do. | H | $OC_2H_5$ | $NH_2$ | –⬡ | $CH_3$ | do. |
| 206 | do. | H | $OC_2H_5$ | OH | $-CH_2-CH_2-K_1$ | ⬡ | do. |
| 207 | do. | H | $OC_2H_5$ | OH | H | $CH_3$ | do. |
| 208 | do. | H | $OC_2H_5$ | OH | –⬡–NH–CO–$C_2H_4$–$K_1$ | $CH_3$ | do. |

Table III-continued

| Ex. No. | K | $B_1$ | $B_2$ | $B_7$ | $B_8$ | $B_9$ | Shade of dyeing on Paper |
|---|---|---|---|---|---|---|---|
| 209 | do. | H | $OC_2H_5$ | OH | —⬡—$OCH_3$ | $CH_3$ | do. |
| 210 | do. | H | $OC_2H_5$ | OH | —⬡—$CH_2$—$K_1$ | $CH_3$ | do. |

Table IV sets forth the structural composition of further dyes which can be produced and/or dyed in accordance with the present process. These dyes are of the formula

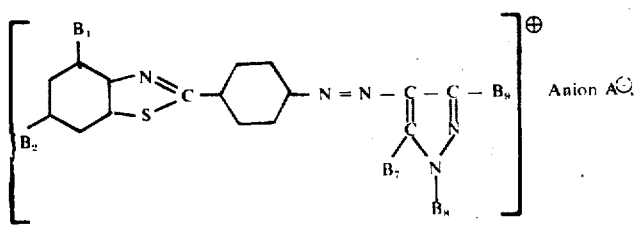   Anion $A^\ominus$ where $B_1$, $B_2$ and $B_7$, $B_8$ and $B_9$ have the meanings given them in Table IV.

The anion $A^\ominus$ may be any one of those named in the specification. K may stand for any of the radicals $K_1$ to $K_{27}$ listed in Table A. These groupings may be exchanged in any given dye for another of the stated groupings.

$K_1$ to $K_{27}$ listed in Table A. These groupings may be exchanged in any given dye for another of the stated groupings. The grouping —$CH_2$—$K^\oplus$ may occur once or twice or preferably one and a half times in the dehydrotoluidine radical given in square brackets; this grouping occupies preferably the 7 and/or 2' position.

Table IV

| Ex. No. | $B_1$ | $B_2$ | $B_7$ | $B_8$ | $B_9$ | Shade of dyeing on Paper |
|---|---|---|---|---|---|---|
| 211 | H | $CH_3$ | OH | —$CH_2$—$CH_2$—$K_1$ | —⬡— | orange |
| 212 | $CH_3$ | $CH_3$ | OH | do. | do. | do. |
| 213 | H | H | OH | do. | do. | do. |
| 214 | H | $OC_2H_5$ | OH | do. | do. | do. |
| 215 | H | $CH_3$ | OH | —⬡—NH—CO—$C_2H_4$—$K_1$ | $CH_3$ | do. |
| 216 | $CH_3$ | $CH_3$ | OH | do. | do. | do. |
| 217 | H | H | OH | do. | do. | do. |
| 218 | H | $OC_2H_5$ | OH | do. | do. | do. |
| 219 | H | $CH_3$ | OH | —⬡—$CH_2$—$K_1$ | $CH_3$ | do. |
| 220 | $CH_3$ | $CH_3$ | OH | do. | do. | do. |
| 221 | H | H | OH | do. | do. | do. |
| 222 | H | $OC_2H_5$ | OH | do. | do. | do. |

Table V shows the structural composition of further dyes which can be produced and/or dyed in accordance with the present process. These dyes are of the formula

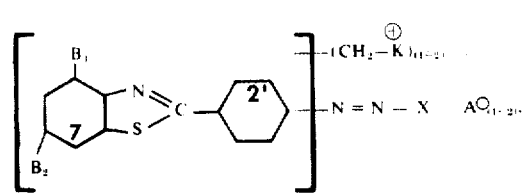

where $B_1$, $B_2$ and X have the meanings given them in Table. The anion $A^\ominus$ may be any one of those named in the specification. $K^\oplus$ may stand for any of the radicals Table V

| Ex. No. | K | $B_1$ | $B_2$ | X = radical of coupling component | Shade of dyeing on paper |
|---|---|---|---|---|---|
| 223 | $K_1$–$K_{27}$ | H | $CH_3$ | —⬡—OH | yellow |
| 224 | do. | H | H | do. | do. |
| 225 | do. | $CH_3$ | $CH_3$ | do. | do. |
| 226 | do. | H | $OC_2H_5$ | do. | do. |
| 227 | do. | H | $CH_3$ | HO—⬡—$CH_3$ | do. |
| 228 | do. | H | H | do. | do. |
| 229 | do. | $CH_3$ | $CH_3$ | do. | do. |
| 230 | do. | H | $OC_2H_5$ | do. | do. |
| 231 | do. | H | $CH_3$ | HO—⬡—$CH_3$ | do. |
| 232 | do. | H | H | do. | do. |
| 233 | do. | $CH_3$ | $CH_3$ | do. | do. |
| 234 | do. | H | $OC_2H_5$ | do. | do. |

Table V-continued

| Ex. No. | K | B₁ | B₂ | X = radical of coupling component | Shade of dyeing on paper |
|---|---|---|---|---|---|
| 235 | do. | H | CH₃ | HO—⬡—CH₃ (2,6-dimethylphenol type) | do. |
| 236 | do. | H | H | do. | do. |
| 237 | do. | CH₃ | CH₃ | do. | do. |
| 238 | do. | H | OC₂H₅ | do. | do. |
| 239 | do. | H | CH₃ | HO—⬡—CH₃ | orange |
| 240 | do. | CH₃ | CH₃ | do. | do. |
| 241 | do. | H | H | do. | do. |
| 242 | do. | H | OC₂H₅ | do. | do. |
| 243 | do. | H | H | HO—⬡—CH₃ | do. |
| 244 | do. | H | H | do. | do. |
| 245 | do. | CH₃ | CH₃ | do. | do. |
| 246 | do. | H | OC₂H₅ | do. | do. |
| 247 | do. | H | CH₃ | HO—⬡(OH)—CH₂OH | do. |
| 248 | do. | H | H | do. | do. |
| 249 | do. | CH₃ | CH₃ | do. | do. |
| 250 | do. | H | OC₂H₅ | HO—⬡(OH)—CH₂OH | do. |
| 251 | do. | H | CH₃ | HO—⬡(OH)—Cl | do. |
| 252 | do. | H | H | do. | do. |
| 253 | do. | CH₃ | CH₃ | do. | do. |
| 254 | do. | H | OC₂H₅ | do. | do. |
| 255 | do. | H | CH₃ | H₂N—⬡ | do. |
| 256 | do. | H | H | do. | do. |
| 257 | do. | CH₃ | CH₃ | do. | do. |
| 258 | do. | H | OC₂H₅ | do. | do. |
| 259 | do. | H | CH₃ | H₂N—⬡—OH | do. |
| 260 | do. | H | H | do. | do. |
| 261 | do. | CH₃ | CH₃ | do. | do. |
| 262 | do. | H | OC₂H₅ | do. | do. |
| 263 | do. | H | H | H₂N—⬡—CH₃ | yellow |
| 264 | do. | H | H | do. | do. |
| 265 | do. | CH₃ | CH₃ | do. | do. |
| 266 | do. | H | OC₂H₅ | do. | do. |
| 267 | do. | H | CH₃ | H₂N—⬡(CH₃)—OCH₃ | do. |
| 268 | do. | H | H | do. | do. |
| 269 | do. | CH₃ | CH₃ | do. | do. |
| 270 | do. | H | OC₂H₅ | do. | do. |
| 271 | do. | H | CH₃ | H₂N—⬡—NH₂ | red. |
| 272 | do. | H | H | do. | do. |
| 273 | do. | CH₃ | CH₃ | do. | do. |
| 274 | do. | H | OC₂H₅ | do. | do. |
| 275 | do. | H | CH₃ | H₂N—⬡(NH₂)—Cl | do. |
| 276 | do. | H | H | do. | do. |
| 277 | do. | CH₃ | CH₃ | do. | do. |
| 278 | do. | H | OC₂H₅ | do. | do. |
| 279 | do. | H | CH₃ | H₂N—⬡(NH₂)—CH₃ | do. |
| 280 | do. | H | H | do. | do. |
| 281 | do. | CH₃ | CH₃ | do. | do. |
| 282 | do. | H | OC₂H₅ | do. | do. |
| 283 | do. | H | CH₃ | H₂N—⬡—CH₃ | yellow |
| 284 | do. | H | H | do. | do. |
| 285 | do. | H | OC₂H₅ | do. | do. |
| 286 | do. | CH₃ | CH₃ | do. | do. |
| 287 | do. | H | CH₃ | 8-hydroxyquinoline | red-orange |
| 288 | do. | H | H | do. | do. |
| 289 | do. | CH₃ | CH₃ | do. | do. |
| 290 | do. | H | OC₂H₅ | do. | do. |

Table VI sets forth the structural composition of further dyes which can be produced and/or dyed in accordance with the present process. These dyes are of the formula

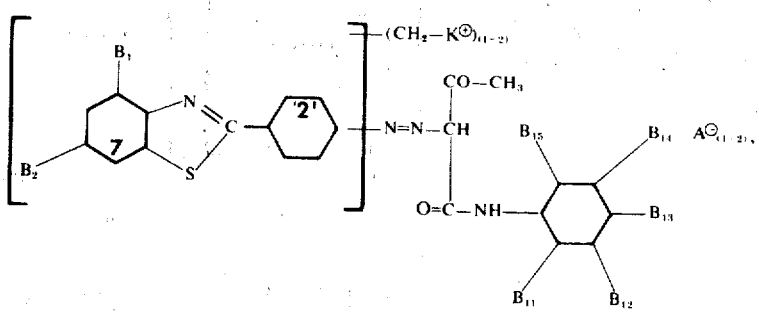

where $B_1$, $B_2$, $B_{11}$, $B_{12}$, $B_{13}$, $B_{14}$ and $B_{15}$ have the meanings given them in Table VI.

The anion $A^{\ominus}$ may be any one of those named in the specification. $K^{\oplus}$ may stand for any one of the radicals $K_1$ to $K_{27}$ listed in Table A. These groupings may be exchanged in any given dye for one of the other stated groupings. The grouping $-CH_2-K^{\oplus}$ may occur once or twice or preferably one and a half times in the dehydrotoluidine radical shown in square brackets; this grouping stands preferably in the 7 and/or 2' position.

Table VI

| Example No. | K | $B_1$ | $B_2$ | $B_{11}$ | $B_{12}$ | $B_{13}$ | $B_{14}$ | $B_{15}$ | Shade of dyeing on Paper |
|---|---|---|---|---|---|---|---|---|---|
| 291 | $K_1$ | H | $CH_3$ | $OCH_3$ | H | H | $-CH_2-K_1$ | H | yellow |
| 292–318 | $K_2-K_{27}$ | H | $CH_3$ | do. | H | H | $-CH_2-K_1$ | H | do. |
| 319 | $K_1-K_{27}$ | H | $CH_3$ | H | H | H | H | H | do. |
| 320 | do. | H | do. | $OCH_3$ | H | H | $OCH_3$ | H | do. |
| 321 | do. | H | do. | do. | H | Cl | $OCH_3$ | H | do. |
| 322 | do. | H | do. | H | H | Cl | H | H | do. |
| 323 | do. | H | do. | $OCH_3$ | H | H | $-CH_2-K_1$ | H | do. |
| 324 | do. | H | do. | H | $-NH-CO-CH_2-K_1$ | H | H | H | do. |
| 325 | do. | H | do. | $CH_3$ | H | H | H | H | do. |
| 326 | do. | H | do. | $CH_3$ | H | H | $-CH_2-K_1$ | H | do. |
| 327 | do. | H | H | $OCH_3$ | H | H | $-CH_2-K_1$ | H | do. |
| 328 | do. | H | H | H | H | H | H | H | do. |
| 329 | do. | H | H | $OCH_3$ | H | H | $OCH_3$ | H | do. |
| 330 | do. | H | H | $OCH_3$ | H | Cl | do. | H | do. |
| 331 | do. | H | H | H | H | Cl | H | H | do. |
| 332 | do. | H | H | $OCH_3$ | H | H | $-CH_2-K_1$ | H | do. |
| 333 | do. | H | H | H | $-NH-CO-CH_2-K_1$ | H | H | H | do. |
| 334 | do. | H | H | $CH_3$ | H | H | H | H | do. |
| 335 | do. | H | H | $CH_3$ | H | H | $-CH_2-K_1$ | H | do. |
| 336 | do. | $CH_3$ | $CH_3$ | $CH_3$ | H | H | do. | H | do. |
| 337 | do. | do. | do. | do. | H | H | do. | H | do. |
| 338 | do. | do. | do. | H | H | H | H | H | do. |
| 339 | do. | do. | do. | $OCH_3$ | H | H | $OCH_3$ | H | do. |
| 340 | do. | do. | do. | do. | H | Cl | do. | H | do. |
| 341 | do. | do. | do. | H | H | Cl | H | H | do. |
| 342 | do. | do. | do. | $OCH_3$ | $-CH_2-K_1$ | H | $-CH_2-K_1$ | H | do. |
| 343 | do. | do. | do. | H | $-NH-CO-CH_2-K_1$ | H | H | H | do. |
| 344 | do. | do. | do. | $CH_3$ | H | H | H | H | do. |
| 345 | do. | do. | do. | do. | H | H | $-CH_2-K_1$ | H | do. |
| 346 | do. | H | $O_2CH_3$ | $CH_3$ | H | H | $CH_2-K_1$ | H | do. |
| 347 | do. | H | do. | do. | H | H | do. | H | do. |
| 348 | do. | H | do. | H | H | H | H | H | do. |
| 349 | do. | H | do. | $OCH_3$ | H | H | $OCH_3$ | H | do. |
| 350 | do. | H | do. | do. | H | Cl | do. | H | do. |
| 351 | do. | H | do. | H | H | Cl | H | H | do. |
| 352 | do. | H | do. | $OCH_3$ | $CH_2-K_1$ | H | $CH_2-K_1$ | H | do. |
| 353 | do. | H | do. | H | $-NH-CO-CH_2-K_1$ | H | H | H | do. |
| 354 | do. | H | do. | $CH_3$ | H | H | H | H | do. |
| 355 | do. | H | do. | do. | H | H | $CH_2-K_1$ | H | do. |

Table VII gives the structural composition of further dyes which can be produced and/or dyed in accordance with the present process. These dyes are of the formula where $B_1$, $B_2$, $B_{11}$, $B_{12}$, $B_{13}$, $B_{14}$ and $B_{15}$ have the meanings assigned to them in Table VII. The anion $A^\ominus$ may be any one of those named in the specification. For the symbol K the notes on Table I and II apply.

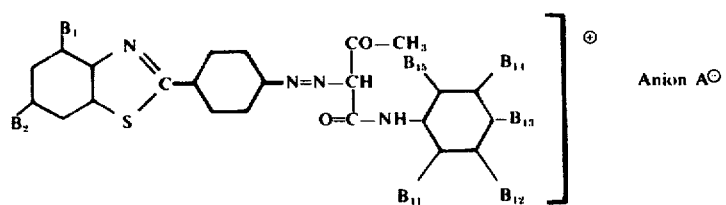

Anion $A^\ominus$

Table VII

| Example No. | $B_1$ | $B_2$ | $B_{11}$ | $B_{12}$ | $B_{13}$ | $B_{14}$ | $B_{15}$ | Shade of dyeing on Paper |
|---|---|---|---|---|---|---|---|---|
| 356 | H | $CH_3$ | $CH_3$ | $CH_2-K_1$ | $CH_3$ | $CH_2-K_1$ | $CH_3$ | yellow |
| 357 | H | do. | do. | $CH_2-K_2$ | do. | $CH_2-K_2$ | do. | do. |
| 358 | H | do. | do. | $CH_2-K_3$ | do. | $CH_2-K_3$ | do. | do. |
| 359 | H | do. | do. | $CH_2-K_{10}$ | do. | $CH_2-K_{10}$ | do. | do. |
| 360 | H | do. | do. | $CH_2-K_{12}$ | do. | $CH_2-K_{12}$ | do. | do. |
| 361 | H | do. | do. | $CH_2-K_{19}$ | do. | $CH_2-K_{19}$ | do. | do. |
| 362 | H | do. | do. | $CH_2-K_{22}$ | do. | $CH_2-K_{22}$ | do. | do. |
| 363 | H | H | do. | $-CH_2-K_1$ | do. | $CH_2-K_1$ | do. | do. |
| 364 | $CH_3$ | $CH_3$ | do. | do. | do. | do. | do. | do. |
| 365 | H | $OC_2H_5$ | do. | do. | do. | do. | do. | do. |
| 366 | H | $CH_3$ | $OCH_3$ | $CH_2-K_1$ | H | $CH_2-K_1$ | H | do. |
| 367 | H | H | do. | do. | H | do. | H | do. |
| 368 | $CH_3$ | $CH_3$ | do. | do. | H | do. | H | do. |
| 369 | H | $OC_2H_5$ | do. | do. | H | do. | H | do. |
| 370 | H | $CH_3$ | H | $-NH-CO-CH_2-K_1$ | H | H | H | do. |
| 371 | H | H | H | do. | H | H | H | do. |
| 372 | $CH_3$ | $CH_3$ | H | do. | H | H | H | do. |

Table VII-continued

| Example No. | $B_1$ | $B_2$ | $B_{11}$ | $B_{12}$ | $B_{13}$ | $B_{14}$ | $B_{15}$ | Shade of dyeing on Paper |
|---|---|---|---|---|---|---|---|---|
| 373 | H | $OC_2H_5$ | H | do. | H | H | H | do. |
| 374 | H | $CH_3$ | $CH_3$ | H | H | $-CH_2-K_1$ | H | do. |
| 375 | H | H | do. | H | H | do. | H | do. |
| 376 | $CH_3$ | $CH_3$ | do. | H | H | do. | H | do. |
| 377 | H | $OC_2H_5$ | do. | H | H | do. | H | do. |

Table VIII gives the structural composition of further dyes which can be produced and/or dyed in accordance with the present process. These dyes are of the formula

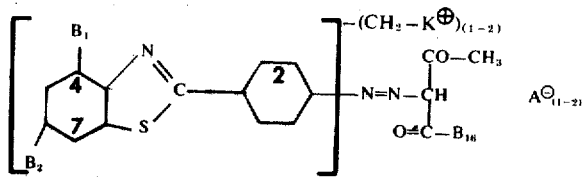

where $B_1$, $B_2$ and $B_{16}$ have the meanings given them in Table VIII. The anion $A^\ominus$ may be any one of those named in the specification. For the symbol $K^\oplus$ the notes on Table I apply. The grouping $-CH_2-K^\oplus$ may occur once or twice or preferably one and a half times in the dehydrotoluidine radical shown in square brackets; this grouping occupies preferably the 7 and/or 2' position.

Table VIII

| Example No. | K | $B_1$ | $B_2$ | $B_{16}$ | Shade of dyeing on Paper |
|---|---|---|---|---|---|
| 378 | $K_1-K_{27}$ | H | $CH_3$ | $-OCH_3$ | yellow |
| 379 | do. | H | $CH_3$ | $-OC_4H_9$ | do. |
| 380 | do. | H | do. | $-NH-CH_3$ | do. |
| 381 | do. | H | do. | $-NH-C_4H_9$ | do. |
| 382 | do. | H | $CH_3$ | $-NH-C_2H_4-K_1$ | do. |
| 383 | do. | H | do. | $-NH_2$ | do. |
| 384 | do. | H | do. | $-O-C_2H_4-K_1$ | do. |
| 385 | do. | H | $CH_3$ | $-O-\bigcirc$ | do. |
| 386 | do. | H | $CH_3$ | $-O-\bigcirc-CH_3$ | do. |
| 387 | do. | H | $CH_3$ | $-O-\bigcirc-OCH_3$ with $CH_3$ | do. |
| 388 | do. | H | $CH_3$ | $-O-\bigcirc-OCH_3$ with $CH_2-K_1$ | do. |
| 389 | do. | H | H | $-OCH_3$ | do. |
| 390 | do. | $CH_3$ | $CH_3$ | do. | do. |
| 391 | do. | H | $OC_2H_5$ | do. | do. |
| 392 | do. | H | H | $OC_4H_9$ | do. |
| 393 | do. | $CH_3$ | $CH_3$ | do. | do. |
| 394 | do. | H | $OC_2H_5$ | do. | do. |
| 395 | do. | H | H | $-NH-CH_3$ | do. |
| 396 | do. | $CH_3$ | $CH_3$ | do. | do. |
| 397 | do. | H | $OC_2H_5$ | do. | do. |
| 398 | do. | H | H | $-NH-C_4H_9$ | do. |
| 399 | do. | $CH_3$ | $CH_3$ | do. | do. |
| 400 | do. | H | $OC_2H_5$ | do. | do. |
| 401 | do. | H | H | $-NH-C_2H_4-K_1$ | do. |
| 402 | do. | $CH_3$ | $CH_3$ | do. | do. |
| 403 | $K_1-K_{27}$ | H | $OC_2H_5$ | $-NH-C_2H_4-K_1$ | yellow |
| 404 | do. | H | H | $-NH_2$ | do. |
| 405 | do. | $CH_3$ | $CH_3$ | do. | do. |
| 406 | do. | H | $OC_2H_5$ | do. | do. |
| 407 | do. | H | H | $-O-C_2H_4-K_1$ | do. |
| 408 | do. | $CH_3$ | $CH_3$ | do. | do. |
| 409 | do. | H | $OC_2H_5$ | do. | do. |
| 410 | do. | H | H | $-O-\bigcirc$ | do. |
| 411 | do. | $CH_3$ | $CH_3$ | do. | do. |
| 412 | do. | H | $OC_2H_5$ | do. | do. |
| 413 | do. | H | H | $-O-\bigcirc-CH_3$ | do. |
| 414 | do. | $CH_3$ | $CH_3$ | do. | do. |
| 415 | do. | H | $OC_2H_5$ | do. | do. |

Table VIII-continued

| Example No. | K | $B_1$ | $B_2$ | $B_{16}$ | Shade of dyeing on Paper |
|---|---|---|---|---|---|
| 416 | do. | H | H | —O—⟨⟩(CH₃)—OCH₃ | do. |
| 417 | do. | CH₃ | CH₃ | do. | do. |
| 418 | do. | H | OC₂H₅ | do. | do. |
| 419 | do. | H | H | —O—⟨⟩(CH₂—K₁)—OCH₃ | do. |
| 420 | do. | CH₃ | CH₃ | do. | do. |
| 421 | do. | H | OC₂H₅ | do. | do. |

Table IX lists the structural composition of further dyes which can be produced and/or dyed in accordance with the present process. These dyes are of the formula

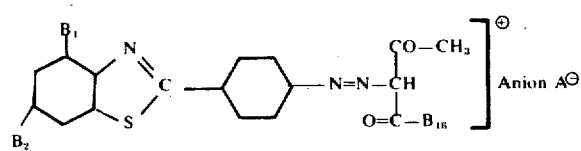

Anion A⊖ where $B_1$, $B_2$ and $B_{16}$ have the meanings given them in Table IX. The anion A⊖ may be any one of those named in the specification.

Table IX

| Example No. | $B_1$ | $B_2$ | $B_{16}$ | Shade of dyeing on Paper |
|---|---|---|---|---|
| 422 | H | CH₃ | —NH—C₂H₄—K₁ | yellow |
| 423 | H | CH₃ | —O—C₂H₄—K₁ | do. |
| 424 | H | CH₃ | —O—⟨⟩(CH₂—K₁)—OCH₃ | do. |
| 425 | H | H | —NH—C₂H₄—K₁ | do. |
| 426 | CH₃ | CH₃ | do. | do. |
| 427 | H | OC₂H₅ | do. | do. |
| 428 | H | H | —O—C₂H₄—K₁ | do. |
| 429 | CH₃ | CH₃ | do. | do. |
| 430 | H | OC₂H₅ | do. | do. |
| 431 | H | H | —O—⟨⟩(CH₂—K₁)—O—CH₃ | do. |
| 432 | CH₃ | CH₃ | do. | do. |
| 433 | H | OC₂H₅ | do. | do. |

Table X sets forth the structural composition of further dyes which can be produced and/or dyed in accordance with the present process. These dyes are of the formula $$\left[ \underset{B_2}{\overset{B_1}{\bigodot}}\text{–}C\text{–}\bigcirc\text{–} \right]\text{–(CH}_2\text{–F)}_{(1-2)}\, B_{22}, B_{23}\text{–N=N–}\bigodot\text{–}B_{21}, B_{20}$$

where $B_1$, $B_2$ and $B_{20}$ to $B_{23}$ have the meanings given them in Table X. F may be any one of the radicals $F_1$ to $F_{13}$ listed in Table B. These groupings may be exchanged in any given dye for another of the stated groupings. The grouping —CH₂—F may occur once or twice or preferably one and a half times in the dehydrotoluidine radical shown in square brackets; this grouping is preferably in the 7 and/or 2' position.

Table B

F may stand for $F_1$ to $F_{13}$ which represent the following groupings:

| | | |
|---|---|---|
| $F_1$ | represent | —N(CH₃)(CH₃) |
| $F_2$ | " | —N(C₂H₅)₂ |
| $F_3$ | represent | —N(CH₃)(C₂H₅) |
| $F_4$ | " | —N⟨piperidine⟩ |
| $F_5$ | " | —NH₂ |
| $F_6$ | " | —NH—CH₃ |
| $F_7$ | " | —NH—C₃H₇ |
| $F_8$ | " | —N(CH₂—CH₂)₂O |
| $F_9$ | " | —N(CH₂—CH₂)₂CH₂ |
| $F_{10}$ | " | —N(CH₂—CH₂)₂(CH₂—CH₂)CH₂ |
| $F_{11}$ | " | —N(CH₂—C₆H₅)(CH₃) |
| $F_{12}$ | " | —N(CH₃)(C₂H₄OH) |
| $F_{13}$ | " | —N(C₂H₄—OH)(C₂H₄—OH) |

TABLE X

| Ex No. | F | $B_1$ | $B_2$ | $B_{20}$ | $B_{21}$ | $B_{22}$ | $B_{23}$ | Shade of dyeing on Paper |
|---|---|---|---|---|---|---|---|---|
| 434 | $F_1$–$F_{13}$ | H | CH₃ | H | H | H | OH | red |
| 435 | do. | H | CH₃ | H | H | —CO—CH₃ | OH | do. |
| 436 | do. | H | CH₃ | H | H | —CO—NH—⟨⟩—CO—C₂H₄—F₁ | OH | do. |

TABLE X-continued

| Ex. No. | F | $B_1$ | $B_2$ | $B_{20}$ | $B_{21}$ | $B_{22}$ | $B_{23}$ | Shade of dyeing on Paper |
|---|---|---|---|---|---|---|---|---|
| 437 | do. | H | $CH_3$ | H | H | $-CO-NH-C_6H_5$ | OH | do. |
| 438 | do. | H | $CH_3$ | H | OH | H | H | do. |
| 439 | do. | H | $CH_3$ | H | OH | $-CO-C_2H_4-F_1$ | H | do. |
| 440 | do. | H | $CH_3$ | H | $-SO_2-NH-CH(CH_3)-C_3H_6-F_1$ | H | OH | do. |
| 441 | do. | H | $CH_3$ | H | H | $-CO-NH-C_2H_4-F_1$ | OH | do. |
| 442 | do. | H | $CH_3$ | H | H | $-CO-NH-CH_2-CH(OH)-CH_2-F_1$ | OH | do. |
| 443 | do. | H | $CH_3$ | H | $-NH-C_2H_4-OH$ | H | H | do. |
| 444 | do. | H | $CH_3$ | H | $-N(CH_3)_2$ | H | H | do. |
| 445 | do. | H | $CH_3$ | H | do. | H | $NH_2$ | do. |
| 446 | do. | H | $CH_3$ | H | do. | H | $-NH-C_2H_4-OH$ | do. |
| 447 | do. | H | $CH_3$ | H | $-N(CH_3)_2$ | H | $-NH-CH_3$ | do. |
| 448 | do. | H | $CH_3$ | H | do. | H | $-NH-C_6H_5$ | do. |
| 449 | do. | H | $CH_3$ | H | Br | H | $-NH_2$ | do. |
| 450 | do. | H | $CH_3$ | H | Cl | H | $-NH_2$ | do. |
| 451 | do. | H | $CH_3$ | H | $CH_3$ | H | $NH_2$ | do. |
| 452 | do. | H | $CH_3$ | $CH_3$ | H | H | $-NH_2$ | do. |
| 453 | do. | H | $CH_3$ | $OCH_3$ | H | H | $-NH_2$ | do. |
| 454 | do. | H | $CH_3$ | H | $OCH_3$ | H | $-NH_2$ | do. |
| 455 | do. | H | $CH_3$ | H | $-NH-C_2H_4-F_1$ | H | $NH_2$ | do. |
| 456 | do. | H | $CH_3$ | H | $-O-CO-CH_2-F_1$ | H | H | do. |
| 457 | do. | H | $CH_3$ | H | $-N(CH_2-CH(OH)-CH_2-F_1)(C_2H_5)$ | H | H | do. |
| 458 | do. | H | $CH_3$ | H | $-SO_2-N(CH_3)_2$ | H | H | do. |
| 459 | do. | H | $CH_3$ | H | H | $-COOC_2H_4-F_1$ | OH | do. |
| 460 | do. | H | $CH_3$ | H | H | $-COOCH_3$ | OH | do. |
| 461 | do. | $CH_3$ | $CH_3$ | H | H | H | OH | do. |
| 462 | do. | $CH_3$ | $CH_3$ | H | H | $-CO-CH_3$ | OH | do. |
| 463 | do. | $CH_3$ | $CH_3$ | H | H | $-CO-NH-\langle\rangle-CO-C_2H_4-F_1$ | OH | do. |
| 464 | do. | $CH_3$ | $CH_3$ | H | H | $-CO-NH-C_6H_5$ | OH | do. |
| 465 | do. | $CH_3$ | $CH_3$ | H | OH | H | H | do. |
| 466 | do. | $CH_3$ | $CH_3$ | H | OH | $-CO-C_2H_4-F_1$ | H | do. |
| 467 | do. | $CH_3$ | $CH_3$ | H | $-SO_2-NH-CH(CH_3)-C_3H_6-F_1$ | H | OH | do. |
| 468 | do. | $CH_3$ | $CH_3$ | H | H | $-CO-NH-C_2H_4-F_1$ | OH | do. |
| 469 | do. | $CH_3$ | $CH_3$ | H | H | $-CO-NH-CH_2-CH(OH)-CH_2-F_1$ | OH | do. |
| 470 | do. | $CH_3$ | $CH_3$ | H | $-NH-C_2H_4-OH$ | H | H | do. |
| 471 | do. | $CH_3$ | $CH_3$ | H | $-N(CH_3)_2$ | H | H | do. |
| 472 | do. | $CH_3$ | $CH_3$ | H | do. | H | $NH_2$ | do. |
| 473 | do. | $CH_3$ | $CH_3$ | H | do. | H | $-NH-C_2H_4-OH$ | do. |
| 474 | do. | $CH_3$ | $CH_3$ | H | $-N(CH_3)_2$ | H | $-NH-CH_3$ | do. |
| 475 | do. | do. | do. | H | do. | H | $-NH-C_6H_5$ | do. |
| 476 | do. | do. | do. | H | Br | H | $-NH_2$ | do. |
| 477 | do. | do. | do. | H | Cl | H | $-NH_2$ | do. |
| 478 | do. | do. | do. | H | $CH_3$ | H | $-NH_2$ | do. |
| 479 | do. | do. | do. | $CH_3$ | H | H | $-NH_2$ | do. |
| 480 | do. | do. | do. | $OCH_3$ | H | H | $-NH_2$ | do. |
| 481 | do. | do. | do. | H | $OCH_3$ | H | $-NH_2$ | do. |
| 482 | do. | do. | do. | H | $-NH-C_2H_4-F_1$ | H | H | do. |
| 483 | do. | do. | do. | H | $-O-CO-CH_2-F_1$ | H | H | do. |
| 484 | do. | do. | do. | H | $-N(CH_2-CH(OH)-CH_2-F_1)(C_2H_5)$ | H | H | do. |
| 485 | do. | do. | do. | H | $-SO_2-N(CH_3)_2$ | H | H | do. |
| 486 | do. | do. | do. | H | H | $-COOC_2H_4-F_1$ | OH | do. |
| 487 | do. | do. | do. | H | H | $-COOCH_3$ | OH | do. |
| 488 | do. | H | H | H | H | H | OH | do. |
| 489 | do. | H | H | H | H | $-CO-CH_3$ | OH | do. |
| 490 | do. | H | H | H | H | $-CO-NH-\langle\rangle-CO-C_2H_4-F_1$ | OH | do. |
| 491 | do. | H | H | H | H | $-CO-NH-C_6H_5$ | OH | do. |
| 492 | do. | H | H | H | OH | H | H | do. |
| 493 | do. | H | H | H | OH | $-CO-C_2H_4-F_1$ | H | do. |
| 494 | do. | H | H | H | $-SO_2-NH-CH(CH_3)-C_3H_6-F_1$ | H | OH | do. |
| 495 | do. | H | H | H | H | $-CO-NH-C_2H_4-F_1$ | OH | do. |
| 496 | do. | H | H | H | H | $-CO-NH-CH_2-CH(OH)-CH_2-F_1$ | OH | do. |
| 497 | do. | H | H | H | $-NH-C_2H_4OH$ | H | H | do. |
| 498 | do. | H | H | H | $-N(CH_3)_2$ | H | H | do. |
| 499 | do. | H | H | H | do. | H | $-NH-C_2$ | do. |

TABLE X-continued

| Ex. No. | F | $B_1$ | $B_2$ | $B_{20}$ | $B_{21}$ | $B_{22}$ | $B_{23}$ | Shade of dyeing on Paper |
|---|---|---|---|---|---|---|---|---|
| 500 | do. | H | H | H | do. | H | $-NH-C_2$-$H_4$-OH | do. |
| 501 | do. | H | H | H | do. | H | $-NH-OH_3$ $H_4-OH$ | do. |
| 502 | do. | H | H | H | do. | H | $-NH-C_6H_5$ | do. |
| 503 | do. | H | H | H | Br | H | $-NH-C_6H_5$ | do. |
| 504 | do. | H | H | H | Cl | H | $-NH_2$ | do. |
| 505 | do. | H | H | H | $CH_3$ | H | $-NH_2$ | do. |
| 506 | do. | H | H | $CH_3$ | H | H | $-NH_2$ | do. |
| 507 | do. | H | H | $OCH_3$ | H | H | $-NH_2$ | do. |
| 508 | do. | H | H | H | $OCH_3$ | H | $-NH_2$ | do. |
| 509 | do. | H | H | H | $-NH-C_2H_4-F_1$ | H | H | do. |
| 510 | do. | H | H | H | $-O-CO-CH_2-F_1$ | H | H | do. |
| 511 | do. | H | H | H | $-N\begin{array}{c}CH_2-CH-CH_2-F_1\\ \phantom{-N}\ \ OH\\ C_2H_5\end{array}$ | H | H | do. |
| 512 | do. | H | H | H | $-SO_2-N(CH_3)_2$ | H | H | do. |
| 513 | do. | H | H | H | H | $-COOC_2H_4-F_1$ | OH | do. |
| 514 | do. | H | H | H | H | $-COOCH_3$ | OH | do. |
| 515 | do. | H | $OC_2H_5$ | H | H | H | OH | do. |
| 516 | do. | H | do. | H | H | $-CO-CH_3$ | OH | do. |
| 517 | do. | H | do. | H | H | $-CO-NH-\bigcirc-CO-C_2H_4-F_1$ | OH | do. |
| 518 | do. | H | do. | H | H | $-CO-NH-C_6H_5$ | OH | do. |
| 519 | do. | H | do. | H | OH | H | H | do. |
| 520 | do. | H | do. | H | OH | $-CO-C_2H_4-F_1$ | H | do. |
| 521 | do. | H | do. | H | $-SO_2-NH-\overset{CH}{\underset{}{CH}}-C_3H_6-F_1$ | H | OH | do. |
| 522 | do. | H | do. | H | H | $-CO-NH-C_2H_4-F_1$ | OH | do. |
| 523 | do. | H | do. | H | H | $-CO-NH-CH_2-\overset{OH}{\underset{}{CH}}-CH_2-F_1$ | OH | do. |
| 524 | do. | H | do. | H | $-NH-C_2H_4OH$ | H | H | do. |
| 525 | do. | H | do. | H | $-N(CH_3)_2$ | H | H | do. |
| 526 | do. | H | do. | H | do. | H | $NH_2$ | do. |
| 527 | do. | H | do. | H | do. | H | $-NH-C_2$-$H_4-OH$ | do. |
| 528 | do. | H | do. | H | do. | H | $-NH-CH_3$ | do. |
| 529 | do. | H | do. | H | do. | H | $-NH-C_6H_5$ | do. |
| 530 | do. | H | do. | H | Br | H | $-NH_2$ | do. |
| 531 | do. | H | do. | H | Cl | H | $-NH_2$ | do. |
| 532 | do. | H | do. | H | $CH_3$ | H | $-NH_2$ | do. |
| 533 | do. | H | do. | $CH_3$ | H | H | $-NH_2$ | do. |
| 534 | do. | H | do. | $OCH_3$ | H | H | $-NH_2$ | do. |
| 535 | do. | H | do. | H | $OCH_3$ | H | $-NH_2$ | do. |
| 536 | do. | H | do. | H | $-NH-C_2H_4-F_1$ | H | H | do. |
| 537 | do. | H | do. | H | $-O-CO-CH_2-F_1$ | H | H | do. |
| 538 | do. | H | do. | H | $-N\begin{array}{c}CH_2-CH-CH_2-F_1\\ \phantom{-N}\ \ OH\\ C_2H_5\end{array}$ | H | H | do. |
| 539 | do. | H | do. | H | $-SO_2N(CH_3)_2$ | H | H | do. |
| 540 | do. | H | do. | H | H | $-COOC_2H_4-F_1$ | OH | do. |
| 541 | do. | H | do. | H | H | $-COOCH_3$ | OH | do. |

Table XI sets forth the structural composition of further dyes which can be produced and/or dyed in accordance with the present process. These dyes are of the formula

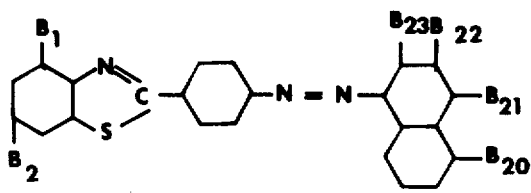

where $B_1$, $B_2$ and $B_{20}$ to $B_{23}$ have the meanings given them in Table XI. F may stand for any one of the radicals $F_1$ to $F_{23}$ in Table B. These groupings may be exchanged in any given dye for one of the other stated groupings.

TABLE XI

| Example No. | $B_1$ | $B_2$ | $B_{20}$ | $B_{21}$ | $B_{22}$ | $B_{23}$ | Shade of dyeing on Paper |
|---|---|---|---|---|---|---|---|
| 542 | H | $CH_3$ | H | H | $-CO-NH-\bigcirc-CO-C_2H_4-F_1$ | OH | red |
| 543 | H | H | H | H | do. | OH | do. |
| 544 | $CH_3$ | $CH_3$ | H | H | do. | OH | do. |
| 545 | H | $OC_2H_5$ | H | H | do. | OH | do. |
| 546 | H | $CH_3$ | H | $-NH-C_2H_4-F_1$ | H | H | do. |
| 547 | H | H | H | do. | H | H | do. |
| 548 | $CH_3$ | $CH_3$ | H | do. | H | H | do. |
| 549 | H | $OC_2H_5$ | H | do. | H | H | do. |

TABLE XI-continued

| Example No. | $B_1$ | $B_2$ | $B_{20}$ | $B_{21}$ | $B_{22}$ | | $B_{23}$ | Shade of dyeing on Paper |
|---|---|---|---|---|---|---|---|---|
| 550 | H | $CH_3$ | H | OH | | $-CO-C_2H_4-F_1$ | H | do. |
| 551 | $CH_3$ | $CH_3$ | H | $-SO_2-NH-CH(CH_3)-C_3H_6-F_1$ | H | | OH | do. |
| 552 | H | $CH_3$ | H | H | $-CO-NH-C_2H_4-F_1$ | | OH | do. |
| 553 | H | H | H | $-O-CO-CH_2-F_1$ | H | | H | red |
| 554 | H | $CH_3$ | H | $-N(CH_2-CH(OH)-CH_2-F_1)(C_2H_5)$ | H | | H | do. |
| 554 | H | $OC_2H_5$ | H | H | $COOC_2H_4-F_1$ | | OH | do. |

Table XII sets forth the structural composition of further dyes which can be produced and/or dyed in accordance with the present process. These dyes are of the formula

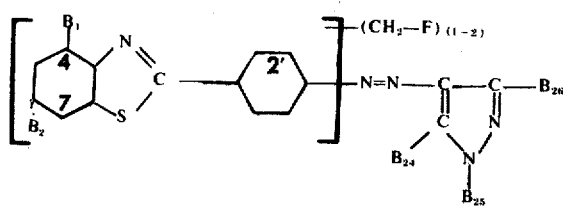

where $B_1$, $B_2$ and $B_{24}$ to $B_{26}$ have the meanings given them in Table XII. For F and the group $-CH_2-F$ the notes on Table X apply.

Table XIII gives the structural composition of further dyes which can be produced and/or dyed in accordance with the present process. These dyes are of the formula

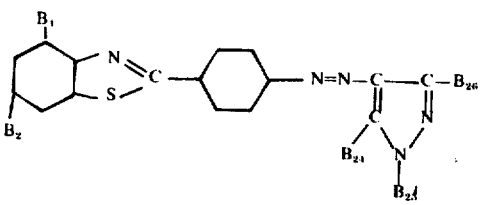

where $B_1$, $B_2$ and $B_{24}$ to $B_{26}$ have the meanings given them in Table XIII. For F the notes on Table XI apply.

TABLE XII

| Example No | F | $B_1$ | $B_2$ | $B_{24}$ | $B_{25}$ | $B_{26}$ | Shade of dyeing on Paper |
|---|---|---|---|---|---|---|---|
| 555–568 | $F_1-F_{13}$ | H | $CH_3$ | OH | | $CH_3$ | orange |
| 569 | do. | H | H | OH | do. | do. | do. |
| 570 | do. | $CH_3$ | $CH_3$ | OH | do. | do. | do. |
| 571 | do. | H | $OC_2H_5$ | OH | do. | do. | do. |
| 572 | do. | H | $CH_3$ | $-NH_2$ | do. | do. | do. |
| 573 | do. | H | $CH_3$ | CH | $-CH_2-CH_2-F_1$ | | do. |
| 574 | do. | H | $CH_3$ | OH | $-CH_2-F_1$ | $CH_3$ | do. |
| 575 | do. | $CH_3$ | $CH_2$ | OH | $-OCH_3$ | do. | do. |
| 576 | do. | H | $CH_3$ | OH | $-NH-CO-C_2H_4-F_1$ | | |
| 577 | do. | H | $CH_3$ | $NH_2$ | | $CH_3$ | do. |

TABLE XIII

| Example No | $B_1$ | $B_2$ | $B_{24}$ | $B_{25}$ | $B_{26}$ | Shade of dyeing on Paper |
|---|---|---|---|---|---|---|
| 578 | H | $CH_3$ | OH | $-CH_2-CH_2-F_1$ | –⬡– | orange |
| 579 | H | $OC_2H_5$ | OH | do. | do. | do. |
| 580 | $CH_3$ | $CH_3$ | OH | do. | do. | do. |
| 581 | H | H | OH | do. | do. | do. |
| 582 | H | $CH_3$ | OH | –⬡–$CH_2-F_1$ | $CH_3$ | do. |
| 583 | $CH_3$ | $CH_3$ | OH | do. | do. | do. |
| 584 | H | H | OH | do. | do. | do. |
| 585 | H | $OC_2H_5$ | OH | do. | do. | do. |
| 586 | H | $CH_3$ | OH | –⬡–$NH-CO-C_2H_4-F_1$ | do. | do. |
| 587 | H | H | OH | do. | do. | do. |

Table XIV sets forth the structural composition of further dyes which can be produced and/or dyed in accordance with the present process. These dyes are of the formula

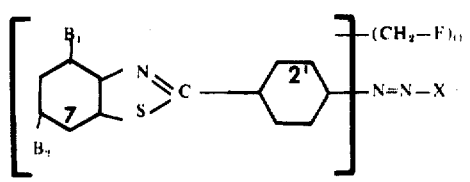

where $B_1$, $B_2$ and X have the meanings given them in the Table. For F and the group —$CH_2$—F the notes on Table X apply.

TABLE XIV

| Examp. No | F | $B_1$ | $B_2$ | X | Shade of dyeing on Paper |
|---|---|---|---|---|---|
| 588 | $F_1$–$F_{13}$ | H | $CH_3$ |  | yellow |
| 589 | do. | $CH_3$ | $CH_3$ | do. | do. |
| 590 | do. | H | $OC_2H_5$ | do. | do. |
| 591 | do. | H | H | do. | do. |
| 592 | do. | H | $CH_3$ |  | do. |
| 593 | do. | H | $CH_3$ |  | do. |
| 594 | do. | H | $CH_3$ |  | do. |
| 595 | do. | H | $CH_3$ |  | orange |
| 596 | do. | H | $CH_3$ |  | do. |
| 597 | do. | H | $CH_3$ |  | do. |
| 598 | do. | H | $CH_3$ |  | do. |
| 599 | do. | H | $CH_3$ |  | yellow |
| 600 | do. | H | $CH_3$ |  | orange |
| 601 | do. | H | $CH_3$ |  | yellow |
| 602 | do. | H | $CH_3$ |  | do. |
| 603 | do. | H | $CH_3$ |  | red |
| 604 | do. | H | $CH_3$ |  | do. |
| 605 | do. | H | $CH_3$ |  | do. |
| 606 | do. | H | $CH_3$ |  | do. |
| 607 | do. | H | $CH_3$ |  | red-orange |

Table XV sets forth the structural composition of further dyes which can be produced and/or dyed in accordance with the present process. These dyes are of the formula

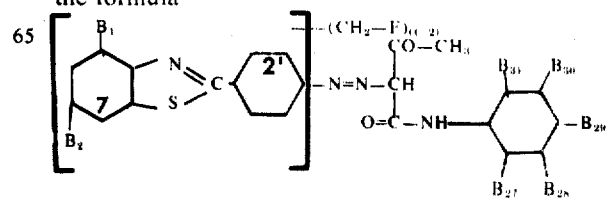

where $B_1$, $B_2$ and $B_{27}$ to $B_{31}$ have the meanings given them in the Table. For F and the group —$CH_2$—F the notes on Table X apply.

TABLE XV

| Example No | F | $B_1$ | $B_2$ | $B_{27}$ | $B_{28}$ | $B_{29}$ | $B_{30}$ | $B_{31}$ | Shade of dyeing on Paper |
|---|---|---|---|---|---|---|---|---|---|
| 608 | $F_1$ | H | $CH_3$ | $OCH_3$ | H | H | —$CH_2$—F | H | yellow |
| 609–622 | $F_2$-$F_{13}$ | H | do. | do. | H | H | do. | H | do. |
| 623 | $F_1$-$F_{13}$ | H | H | do. | H | H | do. | H | do. |
| 624 | do. | $CH_3$ | $CH_3$ | do. | H | H | do. | H | do. |
| 625 | do. | H | $OC_2H_5$ | do. | H | H | do. | H | do. |
| 626 | do. | H | $CH_3$ | H | H | H | H | H | do. |
| 627 | do. | H | $CH_3$ | $OCH_3$ | H | H | $OCH_3$ | H | do. |
| 628 | do. | H | $CH_3$ | $OCH_3$ | H | Cl | $OCH_3$ | H | do. |
| 629 | do. | H | $CH_3$ | H | H | Cl | H | H | do. |
| 630 | do. | H | $CH_3$ | $OCH_3$ | —$CH_2$—$F_1$ | H | —$CH_2$—$F_1$ | H | do. |
| 631 | do. | H | $CH_3$ | H | —NH—CO—$CH_2$—$F_1$ | H | H | H | do. |
| 632 | do. | H | $CH_3$ | $CH_3$ | H | H | H | H | do. |
| 633 | do. | H | $CH_3$ | $CH_3$ | H | H | —$CH_2$—$F_1$ | H | do. |
| 634 | do. | H | H | H | —NH—CO—$CH_2$—$F_1$ | H | H | H | do. |

Table XVI gives the structural composition of further dyes which can be produced and/or dyed in accordance with the present process. These dyes are of the formula

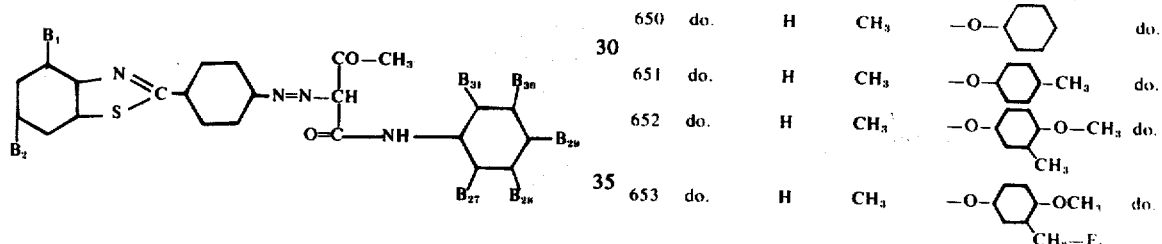

where $B_1$, $B_2$ and $B_{27}$ to $B_{31}$ have the meanings given them in the Table. For F the notes on Table XI apply.

TABLE XVI

| Example No | $B_1$ | $B_2$ | $B_{27}$ | $B_{28}$ | $B_{29}$ | $B_{30}$ | $B_{31}$ | Shade of dyeing on paper |
|---|---|---|---|---|---|---|---|---|
| 635 | H | $CH_3$ | $CH_3$ | $CH_2$—$F_1$ | $CH_3$ | $CH_2$—$F_1$ | $CH_3$ | yellow |
| 636 | H | H | $CH_3$ | do. | do. | do. | do. | do. |
| 637 | $CH_3$ | $CH_3$ | do. | do. | do. | do. | do. | do. |
| 638 | H | $OC_2H_5$ | do. | do. | do. | do. | do. | do. |
| 639 | H | $CH_3$ | $OCH_3$ | H | H | —$CH_2$—$F_1$ | H | do. |
| 640 | H | $CH_3$ | $OCH_3$ | $CH_2$—$F_1$ | H | —$CH_2$—$F_1$ | H | do. |
| 641 | H | $CH_3$ | H | —NH—CO—$CH_2$—$F_1$ | H | H | H | do. |
| 642 | H | $CH_3$ | $CH_3$ | H | H | $CH_2$—$F_1$ | H | do. |

TABLE XVII

| Ex No. | F | $B_1$ | $B_2$ | $B_{32}$ | Shade of dyeing on Paper |
|---|---|---|---|---|---|
| 643 | $F_1$-$F_{13}$ | H | $CH_3$ | —$OCH_3$ | yellow |
| 644 | do. | H | $CH_3$ | $OC_4H_9$ | do. |
| 645 | do. | H | $CH_3$ | —NH—$CH_3$ | do. |
| 646 | do. | H | $CH_3$ | —NH—$C_2H_4$—$F_1$ | do. |
| 647 | do. | H | $CH_3$ | —NH—$C_2H_4$—$F_1$ | do. |
| 648 | do. | H | $CH_3$ | —$NH_2$ | do. |
| 649 | do. | H | $CH_3$ | —O—$C_2H_4$—$F_1$ | do. |
| 650 | do. | H | $CH_3$ | —O—⬡ | do. |
| 651 | do. | H | $CH_3$ | —O—⬡—$CH_3$ | do. |
| 652 | do. | H | $CH_3$ | —O—⬡—O—$CH_3$ (with $CH_3$) | do. |
| 653 | do. | H | $CH_3$ | —O—⬡—$OCH_3$ (with $CH_2$—$F_1$) | do. |
| 654 | do. | H | H | —$OCH_3$ | do. |
| 655 | do. | $CH_3$ | $CH_3$ | do. | do. |
| 656 | do. | H | $OC_2H_5$ | do. | do. |

Table XVII gives the structural composition of further dyes which can be produced and/or dyed in accordance with the present process. These dyes are of the formula

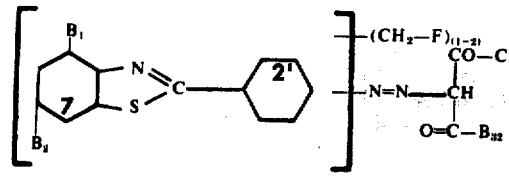

where $B_1$, $B_2$ and $B_{32}$ have the meanings given them in Table XVII. For F and the group —$CH_2$—F the notes on Table X apply.

Table XVIII sets forth the structural composition of further dyes which can be produced and/or dyed in accordance with the present process. These are of the formula where $B_1$, $B_2$ and $B_{32}$ have the meanings given them in Table XVIII. For F the notes on Table XI apply.

TABLE XVIII

| Ex. No. | $B_1$ | $B_2$ | $B_{32}$ | Shade of dyeing on Paper |
|---|---|---|---|---|
| 657 | H | $CH_3$ | $-NH-C_2H_4-F_1$ | yellow |
| 658 | H | H | do. | do. |
| 659 | $CH_3$ | $CH_3$ | do. | do. |
| 660 | H | $OC_2H_5$ | do. | do. |
| 661 | H | $CH_3$ | $-O-C_2H_4-F_1$ | do. |
| 662 | H | $CH_3$ |  | do. |
| 663 | H | H | do | do. |
| 664 | $CH_3$ | $CH_3$ | do | do. |

The following dyes can be produced and dyed in accordance with the process of the present invention. They correspond to the formulae

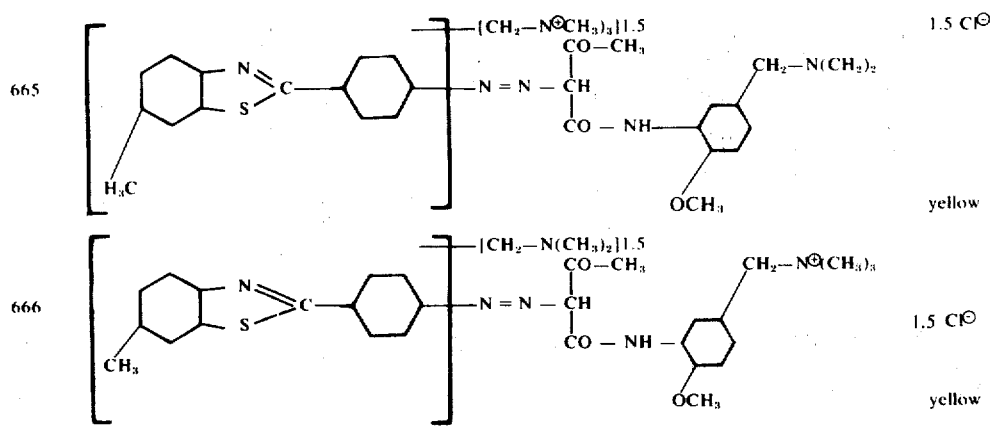

Formulae of representative dyes of the foregoing Examples are as follows:

Example 1

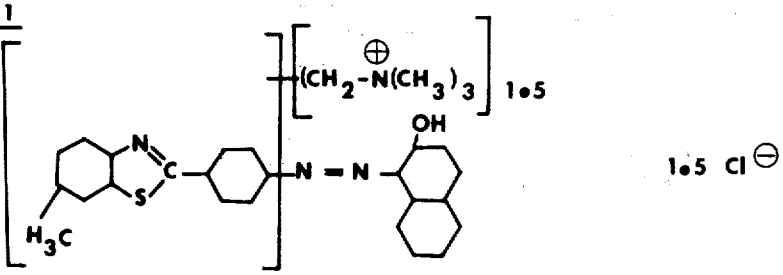

Example 2

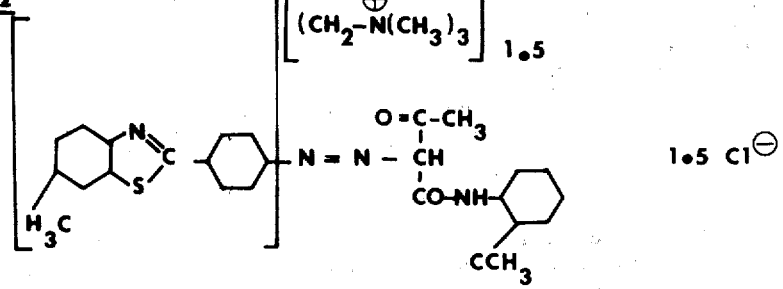

Example 3

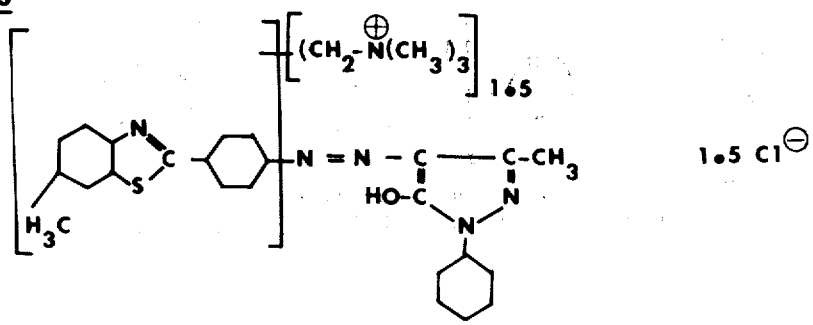

Example 8

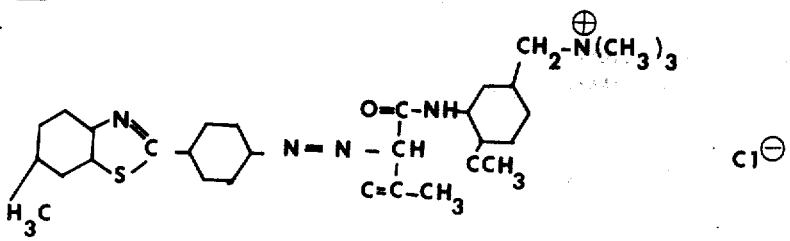

Example 291

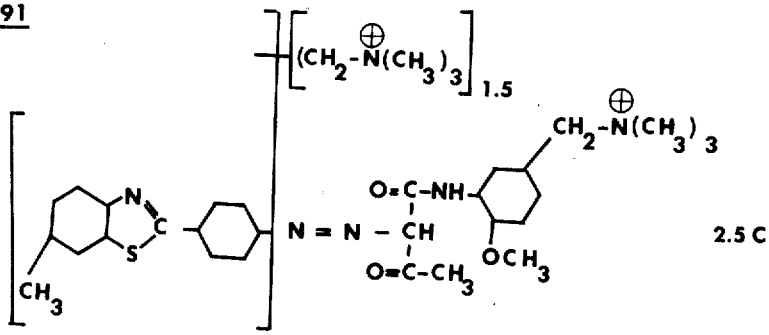

Example 356

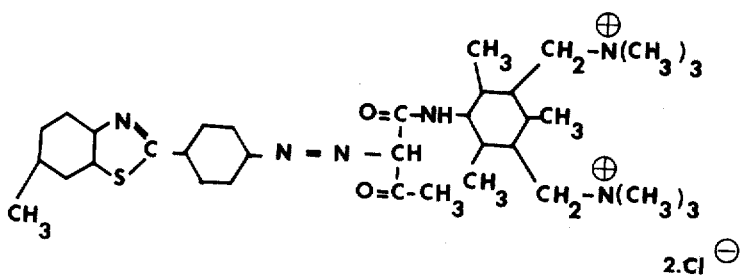

Having thus disclosed the invention, what I claim is:

1. A dye of the formula

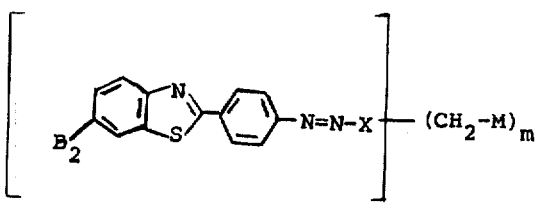

wherein
B$_2$ is hydrogen or methyl,
M is

or

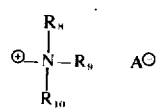

wherein each of R$_8$ and R$_9$ is independently methyl, ethyl or 2-hydroxyethyl,
R$_{10}$ is methyl, ethyl, 2-hydroxyethyl or 2-carbamoylethyl,
each of R$_{11}$ and R$_{12}$ is independently hydrogen, methyl, ethyl or 2-hydroxyethyl, and
A$^\ominus$ is an anion, X is

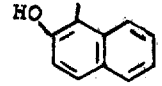, 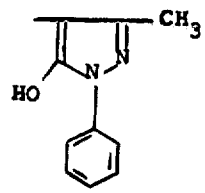

or 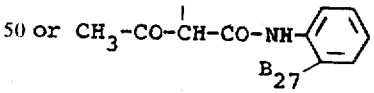, wherein B$_{27}$ is hydrogen, methyl or methoxy, and $m$ is 1 to 3.

2. A dye according to claim 1 wherein $m$ is 1 to 2, inclusive.

3. A dye according to claim 2 wherein each —CH$_2$—M is attached to a 2'- or 7-position of the benzothiazolylphenyl group.

4. A dye according to claim 2 having the formula

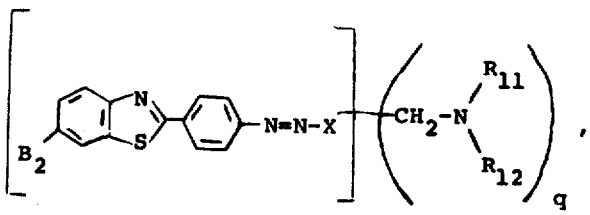

wherein
B₂ is hydrogen or methyl,
R₁₁ is hydrogen, methyl, ethyl or 2-hydroxyethyl,
R₁₂ is hydrogen, methyl, ethyl or 2-hydroxyethyl,
X is

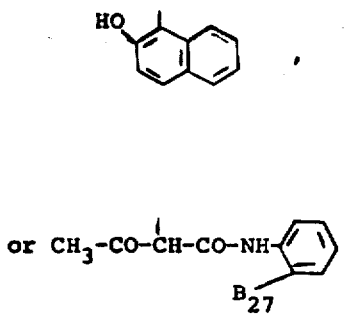

or 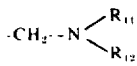

wherein
B₂₇ is hydrogen, methyl or methoxy, and
q is 1 to 2.

5. A dye according to claim 4
wherein each

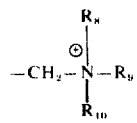

is attached to a 2' or 7-position of the benzothiazolyl-phenyl group.

6. A dye according to claim 2 having the formula

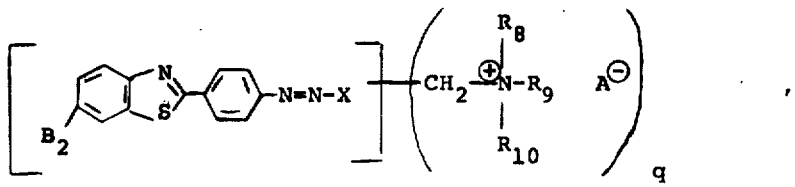

wherein
B₂ is hydrogen or methyl, each of R₈ and R₉ is independently methyl, ethyl or 2-hydroxyethyl,
R₁₀ is methyl, ethyl, 2-hydroxyethyl or 2-carbamoylethyl,
X is

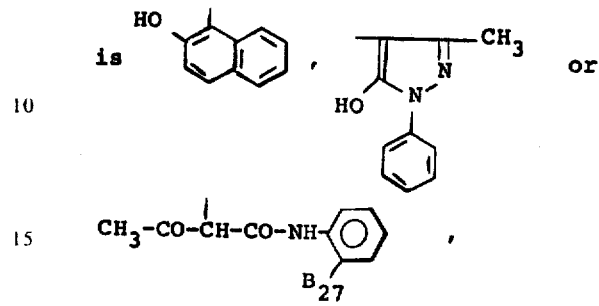 or wherein B₂₇ is hydrogen, methyl or methoxy,
q is 1 to 2, and
A⊖ is an anion.

7. A dye according to claim 6
wherein each is attached to a 2'- or 7-position
of the benzothiazolylphenyl group.

8. A dye according to claim 6 having the formula

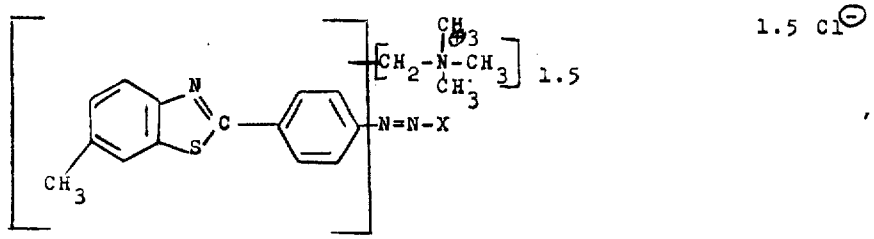

wherein X is

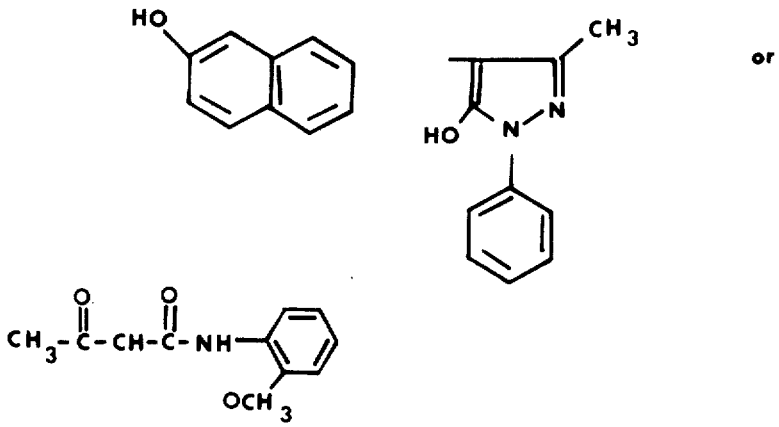

9. A dye according to claim 8 wherein each
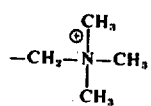
is attached to a 2' or 7-position of the benzothiazolylphenyl group.
10. A dye according to claim 8 having the formula
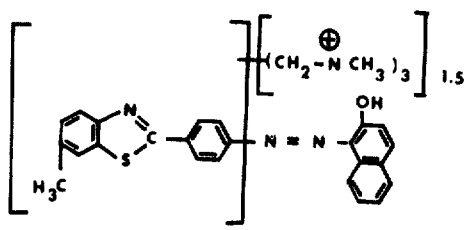
11. A dye according to claim 8 having the formula
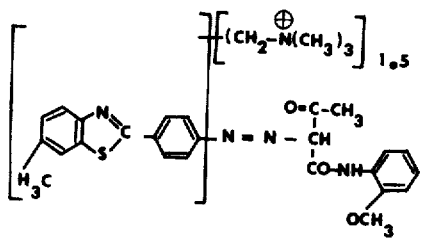
12. A dye according to claim 8 having the formula
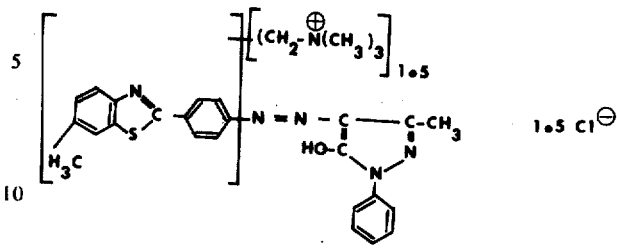
13. The dye according to claim 1 having the formula
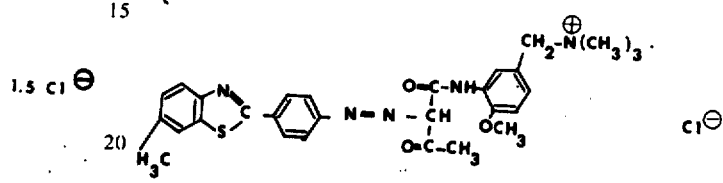
14. A dye according to claim 1 having the formula
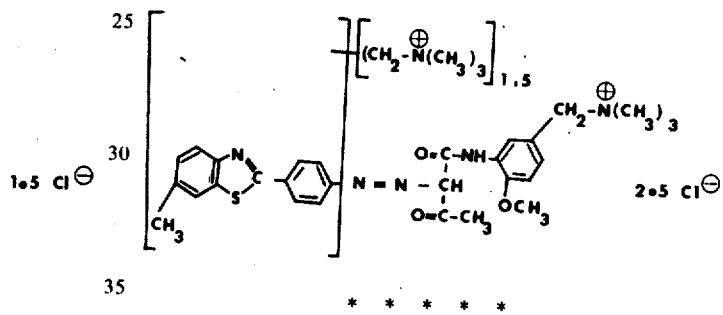
* * * * *